US012082035B2

(12) United States Patent
Trainin et al.

(10) Patent No.: US 12,082,035 B2
(45) Date of Patent: **\*Sep. 3, 2024**

(54) SENSING COORDINATION IN A WIRELESS NETWORK

(71) Applicant: QUALCOMM Incorporated, San Diego, CA (US)

(72) Inventors: Solomon Trainin, Haifa (IL); Assaf Yaakov Kasher, Haifa (IL); Alecsander Petru Eitan, Haifa (IL); Alireza Raissinia, Monte Sereno, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,926

(22) Filed: Jul. 14, 2023

(65) Prior Publication Data

US 2023/0362705 A1    Nov. 9, 2023

Related U.S. Application Data

(63) Continuation of application No. 17/373,441, filed on Jul. 12, 2021, now Pat. No. 11,882,471.

(51) Int. Cl.
*H04W 24/10* (2009.01)
*H04W 24/02* (2009.01)

(52) U.S. Cl.
CPC ........... *H04W 24/10* (2013.01); *H04W 24/02* (2013.01)

(58) Field of Classification Search
CPC ....... H04W 24/10; H04W 24/02; H04W 8/22; H04W 24/08; H04W 84/12
See application file for complete search history.

(56) References Cited

U.S. PATENT DOCUMENTS

2019/0191323 A1\* 6/2019 Venkatesan ........... H04L 1/0009
2020/0314220 A1\* 10/2020 Segev ..................... H04L 47/31
(Continued)

OTHER PUBLICATIONS

IEEE 802.11-21/0644r2, May 10, 2021, IEEE.\*
Trainin S., et al., "Sensing Session and Measurement Exchange Identification", IEEE 802.11-21/0644r2, May 10, 2021, pp. 1-14.

*Primary Examiner* — Jae Y Lee
(74) *Attorney, Agent, or Firm* — Holland & Hart LLP

(57) ABSTRACT

In some implementations, an initiator device establishes a measurement session with each of a plurality of responder devices based at least in part on their capabilities. The initiator device negotiates, with each of the responder devices, a respective set of one or more sensing parameters based at least in part on the capabilities of the initiator device and the capabilities of the respective responder device, the respective sets of sensing parameters associated with the responder devices being identified by a unique Measurement Setup identifier (ID). The initiator device performs one or more measurement instances with the responder devices based on the respective sets of sensing parameters, each measurement instance identified by a unique Measurement Instance ID and the respective Measurement Setup ID. The initiator device obtains, from each responder device, one or more measurement reports indicating channel state information (CSI) based on the one or more respective measurement instances.

30 Claims, 21 Drawing Sheets

(56) References Cited

U.S. PATENT DOCUMENTS

| | | | | |
|---|---|---|---|---|
| 2022/0399923 A1* | 12/2022 | Suh | ........................ | H04W 48/16 |
| 2023/0009140 A1* | 1/2023 | Trainin | .................. | H04W 24/02 |
| 2023/0221428 A1* | 7/2023 | Jang | ....................... | H04W 76/11 |
| | | | | 342/42 |
| 2023/0262768 A1* | 8/2023 | Ko | ......................... | H04W 76/15 |

* cited by examiner

SENSING COORDINATION IN A WIRELESS NETWORK

CROSS REFERENCE

The present Application for Patent is a Continuation of U.S. patent application Ser. No. 17/373,441 by TRAININ et al., entitled "SENSING COORDINATION IN A WIRELESS NETWORK" filed Jul. 12, 2021, assigned to the assignee hereof, and expressly incorporated by reference in its entirety herein.

TECHNICAL FIELD

This disclosure relates generally to wireless communication, and more specifically, to sounding techniques for RF sensing in wireless communication systems.

DESCRIPTION OF THE RELATED TECHNOLOGY

Wireless communication devices communicate by transmitting and receiving electromagnetic signals in the radio frequency (RF) spectrum. The operating environment of the wireless communication devices affects the propagation of the electromagnetic signals. For example, electromagnetic signals transmitted by a transmitting device may reflect off objects and surfaces in the environment before reaching a receiving device located a distance away. Accordingly, the amplitudes or phases of the electromagnetic signals received by the receiving device may depend, at least in part, on the characteristics of the environment.

RF sensing is a technique for sensing objects or movement in an environment based, at least in part, on the transmission and reception of electromagnetic signals. More specifically, changes in the environment can be detected based on changes in the electromagnetic signals (such as phase or amplitude) propagating through the environment. For example, a person moving through the environment interferes with the electromagnetic signals that are transmitted by a transmitting device. A receiving device may detect and characterize such changes to its received signals to determine the speed or direction of the person's movement.

In some instances, a plurality of transmitting devices and receiving devices may be used to detect the presence and/or movement of objects in the environment using wireless sensing. A mechanism for coordinating wireless sensing operations between multiple transmitting devices and multiple receiving devices is needed.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. In some implementations, the method may be performed by an initiator device and may include establishing a separate measurement session on one or more wireless channels with each of a plurality of responder devices based at least in part on capabilities of the respective responder devices, each measurement session being identified by a medium access control (MAC) address and one of an association identifier (AID) or an unassociated identifier (UID) of the initiator device and a MAC address and one of an AID or a UID of the respective responder device. The method may include negotiating, with each of the responder devices, a respective set of one or more sensing parameters based at least in part on the capabilities of the initiator device and the capabilities of the respective responder device, the respective sets of sensing parameters associated with the responder devices being identified by a unique Measurement Setup identifier (ID). The method may include performing one or more measurement instances on the one or more wireless channels with the responder devices based on the respective sets of sensing parameters, each measurement instance being identified by a unique Measurement Instance ID and the respective Measurement Setup ID. The method may include obtaining, from each of the responder devices, one or more measurement reports indicating channel state information (CSI) based on the one or more respective measurement instances. Each measurement report may include the Measurement Instance ID of a respective measurement instance and the Measurement Setup ID. In some instances, each Measurement Instance ID identifies one or more of poll frames, trigger frames, sounding announcements, renewals of long training field (LTF) keys, or measurement reports associated with a respective measurement instance. In some implementations, a first group of the responder devices may include wireless stations (STAs) associated with the AP and identified by their respective AIDs, and a second group of the responder devices may include unassociated STAs identified by their respective UIDs. In some aspects, the UIDs may be associated with a Pre-Association Security Negotiation (PASN).

In various implementations, the respective set of sensing parameters may indicate one or more of a transmission bandwidth of sounding sequences associated with a respective measurement instance, a duration of the measurement instances, the number of measurement instances associated with the measurement setup, or roles assigned to the responder devices. In some instances, the Measurement Setup ID indicates the sets of sensing parameters, the roles assigned to one or more of the responder devices, a schedule for performing the measurement instances and obtaining the measurement reports, and a report type and format for the measurement reports. In some implementations, the initiator device may assign a transmitting device role or a receiving device role or both transmitting and receiving device roles to one or more of the responder devices during negotiation of the sensing parameters. In some instances, the measurement reports are obtained from responder devices assigned to the receiving device role, and sounding sequences are solicited from responder devices assigned to the transmitting device role.

In some implementations, the method may also include changing a role assignment of the respective responder device based on an absence of measurement reports obtained from the respective responder device or changes in the sensing parameters. In some other implementations, the method may also include determining whether one or more of the responder devices are unable to support the established measurement setup, and adding one or more other responder devices to the established measurement setup in response to determining that the one or more responder devices are unable to support the established measurement setup.

In some implementations, obtaining the measurement reports includes transmitting a poll frame identifying one or more of the responder devices for a corresponding measurement instance, the poll frame including the Measurement Instance ID of the corresponding measurement instance and the Measurement Setup ID identifying the sets of sensing parameters. Obtaining the measurement reports may also include receiving response frames from the responder devices identified by the poll frame. In some instances, the Measurement Instance ID and the Measurement Setup ID are carried in a Dialogue Token field of the poll frame. In some other instances, the poll frame includes a control field indicating that the poll frame is a Trigger Frame (TF) Sensing Poll frame.

In some other implementations, obtaining the measurement reports further includes transmitting a Null Data Packet (NDP) Announcement, followed by an NDP, on the one or more wireless channels to the identified responder devices during a respective measurement instance, and receiving the measurement reports from the identified responder devices, the measurement reports indicating CSI based on the NDP transmitted during the respective measurement instance. In some instances, the NDP Announcement includes a Dialogue Token field carrying the Measurement Instance ID of the respective measurement instance and the Measurement Setup ID identifying the sets of sensing parameters. In some other instances, the NDP Announcement includes a control field indicating that the NDP Announcement is a Sensing NDP Announcement frame.

In some other implementations, obtaining the measurement reports further includes transmitting a sounding trigger frame identifying one or more of the responder devices, receiving an NDP from each of the responder devices identified by the sounding trigger frame, and determining the CSI of the one or more wireless channels based on the received NDPs. In some instances, the sounding trigger frame includes a Dialogue Token field carrying the Measurement Instance ID of the corresponding measurement instance and the Measurement Setup ID identifying the sets of sensing parameters. In some other instances, the sounding trigger frame includes a control field indicating that the sounding trigger frame is a TF Sensing Sounding trigger frame. In some implementations, the poll frame, the sounding trigger frame, and the NDP Announcement identify a respective responder device based on an AID or a UID of the respective responder device. In some instances, one or more of the poll frame, the sounding trigger frame, or the NDP Announcement includes a transmitter address (TA) field configured to verify the AID or UID of the respective responder device. In some other instances, one or more of the poll frame, the sounding trigger frame, or the NDP Announcement includes a receiver address (RA) field set to a broadcast address.

In some implementations, the initiator device is an access point (AP), and the method further includes configuring a tunneled direct link setup (TDLS) between two or more of the responder devices. In some other implementations, the initiator device is a wireless station (STA), and method further includes establishing a TDLS between the initiator device and two or more of the responder devices. In some other implementations, the initiator device is a STA, and the method further includes selecting an AP as a proxy for the initiator device, and delegating transmission of poll frames, trigger frames, NDP Announcements, NDPs, and renewals of LTF keys associated with the measurement exchange to the selected AP.

Another innovative aspect of the subject matter described in this disclosure can be implemented in a wireless communication device. The wireless communication device may include at least one modem, at least one processor communicatively coupled with the at least one modem, and at least one memory communicatively coupled with the at least one processor. In some implementations, the at least one memory stores processor-readable code that, when executed by the at least one processor in conjunction with the at least one modem, may be configured to establish a separate measurement session on one or more wireless channels with each of a plurality of responder devices based at least in part on capabilities of the respective responder devices, each measurement session being identified by a medium access control (MAC) address and one of an association identifier (AID) or an unassociated identifier (UID) of the initiator device and a MAC address and one of an AID or a UID of the respective responder device. Execution of the processor-readable code may be configured to negotiate, with each of the responder devices, a respective set of one or more sensing parameters based at least in part on the capabilities of the initiator device and the capabilities of the respective responder device, the respective sets of sensing parameters associated with the responder devices being identified by a unique Measurement Setup identifier (ID). Execution of the processor-readable code may be configured to perform one or more measurement instances on the one or more wireless channels with the responder devices based on the respective sets of sensing parameters, each measurement instance being identified by a unique Measurement Instance ID and the respective Measurement Setup ID. Execution of the processor-readable code may be configured to obtain, from each of the responder devices, one or more measurement reports indicating channel state information (CSI) based on the one or more respective measurement instances, where each measurement report includes the Measurement Instance ID of the respective measurement instance and the Measurement Setup ID. In some instances, each Measurement Instance ID identifies one or more of poll frames, trigger frames, sounding announcements, renewals of LTF keys, or measurement reports of an associated measurement instance. In some implementations, a first group of the responder devices may include wireless stations (STAs) associated with the AP and identified by their respective AIDs, and a second group of the responder devices may include unassociated STAs identified by their respective UIDs. In some aspects, the UIDs may be associated with a Pre-Association Security Negotiation (PASN).

In various implementations, the respective set of sensing parameters may indicate one or more of a transmission bandwidth of sounding sequences associated with a respective measurement instance, a duration of the measurement instances, the number of measurement instances associated with the measurement setup, or roles assigned to the responder devices. In some instances, the Measurement Setup ID indicates the sets of sensing parameters, the roles assigned to one or more of the responder devices, a schedule for performing the measurement instances and obtaining the measurement reports, and a report type and format for the measurement reports. In some implementations, the initiator device may assign a transmitting device role or a receiving device role or both transmitting and receiving device roles to one or more of the responder devices during negotiation of the sensing parameters. In some instances, the measurement reports are obtained from responder devices assigned to the receiving device role, and sounding sequences are solicited from responder devices assigned to the transmitting device role.

In some implementations, execution of the processor-readable code may be further configured to change a role assignment of a respective responder device based on an absence of measurement reports obtained from the respective responder device or changes in the sensing parameters. In some other implementations, execution of the processor-readable code may be further configured to determine whether one or more of the responder devices are unable to support the established measurement setup, and to add one or more other responder devices to the established measurement setup in response to determining that the one or more responder devices are unable to support the established measurement setup.

In some implementations, execution of the processor-readable code to obtain the measurement reports may include transmitting a poll frame identifying one or more of the responder devices for a corresponding measurement instance, the poll frame including the Measurement Instance ID of the corresponding measurement instance and the Measurement Setup ID identifying the sets of sensing parameters. Obtaining the measurement reports may also include receiving response frames from the responder devices identified by the poll frame. In some instances, the Measurement Instance ID and the Measurement Setup ID are carried in a Dialogue Token field of the poll frame. In some other instances, the poll frame includes a control field indicating that the poll frame is a Trigger Frame (TF) Sensing Poll frame.

In some other implementations, execution of the processor-readable code to obtain the measurement reports may include transmitting an NDP Announcement, followed by an NDP, on the one or more wireless channels to the identified responder devices during a respective measurement instance, and to receive the measurement reports from the identified responder devices, the measurement reports indicating CSI based on the NDP transmitted during the respective measurement instance. In some instances, the NDP Announcement includes a Dialogue Token field carrying the Measurement Instance ID of the respective measurement instance and the Measurement Setup ID identifying the sets of sensing parameters. In some other instances, the NDP Announcement includes a control field indicating that the NDP Announcement is a Sensing NDP Announcement frame.

In some other implementations, execution of the processor-readable code to obtain the measurement reports may include transmitting a sounding trigger frame identifying one or more of the responder devices, receiving an NDP from each of the responder devices identified by the sounding trigger frame, and determining the CSI of the one or more wireless channels based on the received NDPs. In some instances, the sounding trigger frame includes a Dialogue Token field carrying the Measurement Instance ID of the corresponding measurement instance and the Measurement Setup ID identifying the sets of sensing parameters. In some other instances, the sounding trigger frame includes a control field indicating that the sounding trigger frame is a TF Sensing Sounding trigger frame. In some implementations, the poll frame, the sounding trigger frame, and the NDP Announcement identify a respective responder device based on an AID or a UID of the respective responder device. In some instances, one or more of the poll frame, the sounding trigger frame, or the NDP Announcement includes a transmitter address (TA) field configured to verify the AID or UID of the respective responder device. In some other instances, one or more of the poll frame, the sounding trigger frame, or the NDP Announcement includes a receiver address (RA) field set to a broadcast address.

In some implementations, the initiator device is an AP, and execution of the processor-readable code configures a TDLS between two or more of the responder devices. In some other implementations, the initiator device is a STA, and execution of the processor-readable code is further configured to establish a TDLS between the initiator device and two or more of the responder devices. In some other implementations, the initiator device is a STA, and execution of the processor-readable code is further configured to select an AP as a proxy for the initiator device, and delegating transmission of poll frames, trigger frames, NDP Announcements, NDPs, and renewals of LTF keys associated with the measurement exchange to the selected AP.

Details of one or more implementations of the subject matter described in this disclosure are set forth in the accompanying drawings and the description herein. Other features, aspects, and advantages will become apparent from the description, the drawings and the claims. Note that the relative dimensions of the following figures may not be drawn to scale.

DETAILED DESCRIPTION

Figure 1:
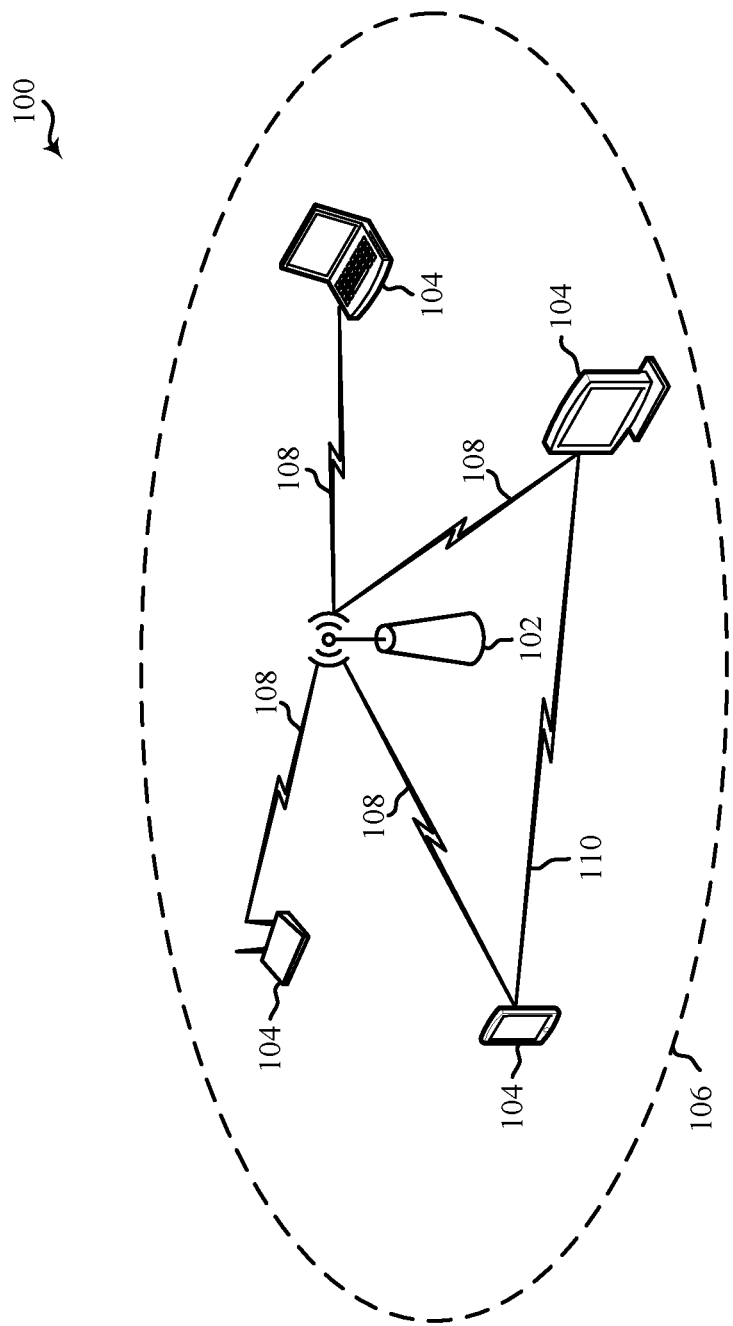
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system, or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to RF or wireless sensing in wireless communication systems. Some implementations more specifically relate to using wireless communication devices conforming to the IEEE 802.11 family of wireless communication standards to detect the presence and/or movement of objects in an environment via wireless sensing. A WLAN may be formed by one or more access points (APs) that provide a shared wireless communication medium for use by a number of client devices such as wireless stations (STAs). The basic building block of a WLAN conforming to the IEEE 802.11 family of standards is a Basic Service Set (BSS), which is managed by an AP. Each BSS is identified by a Basic Service Set Identifier (BSSID) that is advertised by the AP in one or more beacon frames. Wireless communication devices (such as APs and STAs) communicate with one another by transmitting and receiving electromagnetic signals in the RF spectrum. Electromagnetic signals transmitted by a transmitting device may reflect off objects and surfaces along the transmission path before reaching a receiving device located a distance away. The electromagnetic signals may carry information and data that can be used by the receiving device to estimate conditions or determine channel state information (CSI) of the wireless channel. The channel measurements can be used to detect the presence and/or movement of various objects in the environment.

Aspects of the present disclosure recognize that the accuracy, sensitivity, and coverage area of wireless sensing systems may increase as the number of wireless communication devices participating in the sensing operation increases. Thus, in some implementations, an initiator device may separately establish one or more measurement sessions with each of a plurality of wireless communication devices operating as responder devices for sensing changes on or associated with a wireless channel in a coordinated manner. More specifically, the initiator device may discover nearby wireless communication devices and exchange capabilities and other suitable discovery information with the wireless communication devices. The initiator device may select one or more of the discovered devices to participate as responder devices in one or more measurement instances of a measurement exchange based at least in part on the capabilities of the initiator device and the capabilities of the selected devices. The initiator device may negotiate parameters and sounding schedules with the selected responder devices, and may employ one or more security protocols to ensure that wireless communications between the initiator device and the selected responder devices are secure and protected. The initiator device may assign a Measurement Setup ID to the set of parameters negotiated with each of the responder devices. The Measurement Setup ID may also be used to identify the roles assigned to the responder devices participating in the measurement exchange.

The respective set of parameters may include sensing parameters (such as the particular sounding sequences to be used, a transmission bandwidth of the sounding sequences, a duration of the measurement instances, the number of measurement instances associated with the measurement setup, and so on) and transmit parameters (such as the transmit power level used to transmit the sounding sequences, the number of spatial streams used to transmit the sounding sequences, antenna configurations used to transmit the sounding sequences, and so on). The sounding schedule may indicate particular times or periods of time during which the selected devices are to be in a wake state, particular times or periods of time during which the selected devices are to receive poll frames, trigger frames, or sounding sequences from other devices (such as the initiator device), particular times or periods of time during which the selected devices are to determine the CSI of one or more wireless channels, and/or particular times or periods of time during which the selected devices are to transmit measurement reports to other devices (such as the initiator device).

In some implementations, the initiator device may assign or allocate a unique Measurement Instance ID to each of the measurement instances of the measurement exchange. The Measurement Instance ID may be used to identify poll frames, trigger frames, sounding announcements, renewals of LTF keys, and measurement reports exchanged during or otherwise associated with the corresponding measurement instance. In some instances, the Measurement Instance ID of a respective measurement instance and the Measurement Setup ID identifying the sets of sensing parameters are carried in a field (such as the Dialog token field) in each of the poll frames, trigger frames, sounding announcements, and measurement reports associated with the respective measurement instance.

In some implementations, the initiator device may assign the role of receiving device to a group of the selected devices, and then transmit sounding sequences over the wireless channel to the group of selected devices during a respective measurement instance. In some aspects, the sounding sequences may be LTFs carried in a Null Data Packet (NDP). The group of selected devices may use the sounding sequence transmissions to estimate channel conditions or determine channel state information (CSI) during the respective measurement instance, and may transmit measurement reports indicating the determined CSI to one or more other devices (such as the initiator device). In some other implementations, the initiator device may assign the role of transmitting device to the group of selected devices, and then transmit a sounding trigger frame that identifies the group of selected devices for a respective measurement instance. The group of selected devices may transmit sounding sequences (such as LTFs carried in an NDP) over the wireless channel to one or more other devices (such as the initiator device) during the respective measurement instance, and the one or more other devices may use the sounding sequence transmissions to estimate channel conditions or determine CSI of the wireless channel.

In some aspects, the initiator device may change the role assignments of one or more participating devices at any suitable time during the measurement exchange. For example, the initiator device may assign receiving device roles to a group of devices, and then determine that the group of devices is no longer able to estimate channel conditions or determine CSI (e.g., due to changes in the locations of the group of devices). Thus, in some implementations, the initiator device may re-assign the receiving device role to another group of devices better suited to estimate channel conditions or determine CSI. In some instances, the initiator device may also assign the receiving device role to itself.

Particular implementations of the subject matter described in this disclosure can be implemented to realize one or more of the following potential advantages. As discussed, the Measurement Instance ID of a respective measurement instance and the Measurement Setup ID identifying the sets of parameters may be carried in the frames or packets exchanged during the respective measurement instance. In this way, the initiator device and the responder devices can identify frames or packets associated with the respective measurement instance, irrespective of whether such frames or packets are transmitted and received during the same measurement instance. The initiator device may also use the Measurement Setup ID and the Measurement Instance ID to identify which devices are participating in a particular measurement instance.

Aspects of the present disclosure recognize that by providing a mechanism through which the initiator device can dynamically switch or update roles assigned to one or more of the devices selected to participate in the measurement exchange, the initiator device can modify various aspects of the measurement exchange or its individual measurement instances based on changes detected in the environment, changes detected in one or more of the selected devices, or changes in one or more of the sets of sensing parameters. For example, if movement of a particular device assigned to the role of transmitting device decreases its ability to transmit sounding sequences suitable for channel estimation and increases its ability to estimate channel conditions, the initiator device may re-assign the particular device to the role of receiving device (such that the particular device estimates channel conditions rather than transmitting the sounding sequences used for channel estimation).

Aspects of the present disclosure also recognize that by establishing a measurement setup with a plurality of responder devices based on a mutually agreed upon sounding schedule, the responder devices are more likely to be awake and available to participate in the measurement exchange than if the responder devices were unaware of their roles or the various timing aspects of the scheduled measurement instances of the measurement exchange.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, 802.11be and 802.11bf, in addition to further amendments). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHZ, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, 802.11be and 802.11bf). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described herein). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2:
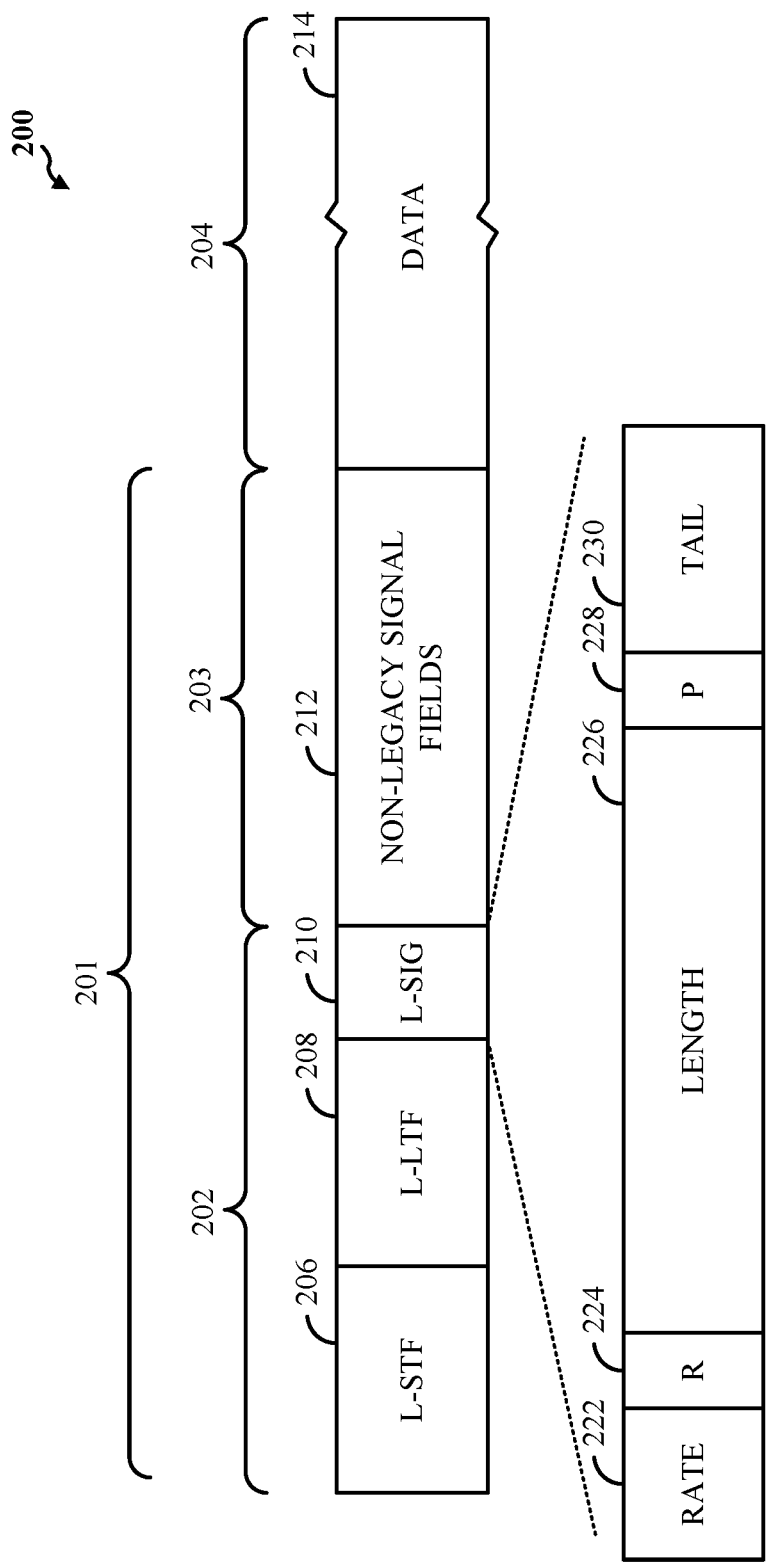
FIG. 2 shows an example protocol data unit (PDU) usable for communications between an access point (AP) and one or more wireless stations (STAs).

FIG. 2 shows an example protocol data unit (PDU) 200 usable for wireless communication between an AP and a number of STAs. For example, the PDU 200 can be configured as a PPDU. As shown, the PDU 200 includes a PHY preamble 201 and a PHY payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a wireless communication protocol standard. The preamble 201 also may include a second portion 203 including one or more non-legacy signal fields 212, for example, conforming to an IEEE wireless communication protocol such as the IEEE 802.11ac, 802.11ax, 802.11be or later wireless communication protocol standards.

L-STF 206 generally enables a receiving device to perform automatic gain control (AGC) and coarse timing and frequency estimation. L-LTF 208 generally enables a receiving device to perform fine timing and frequency estimation and also to perform an initial estimate of the wireless channel. L-SIG 210 generally enables a receiving device to determine a duration of the PDU and to use the determined duration to avoid transmitting on top of the PDU. For example, L-STF 206, L-LTF 208 and L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

FIG. 2 also shows an example L-SIG 210 in the PDU 200. L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3A:
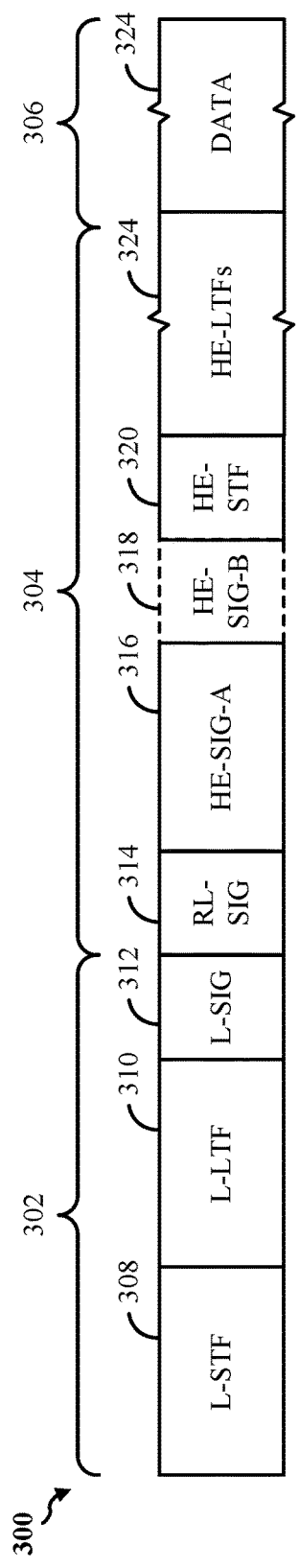
FIG. 3A shows an example PDU usable for communications between an AP and one or more STAs.

FIG. 3A shows another example PDU 300 usable for wireless communication between an AP and a number of STAs. The PDU 300 includes a PHY preamble including a first portion 302 and a second portion 304. The PDU 300 may further include a PHY payload 306 after the preamble, for example, in the form of a PSDU including a DATA field 322. The first portion 302 of the preamble includes L-STF 308, L-LTF 310, and L-SIG 312. The second portion 304 of the preamble and the DATA field 322 may be formatted as a Very High Throughput (VHT) preamble and frame, respectively, in accordance with the IEEE 802.11ac amendment to the IEEE 802.11 wireless communication protocol standard. The second portion 304 includes a first VHT signal field (VHT-SIG-A) 314, a VHT short training field (VHT-STF) 316, a number of VHT long training fields (VHT-LTFs) 318, and a second VHT signal field (VHT-SIG-B) 320 encoded separately from VHT-SIG-A 314. Like L-STF 308, L-LTF 310, and L-SIG 312, the information in VHT-SIG-A 314 may be duplicated and transmitted in each of the component 20 MHz subchannels in instances involving the use of a bonded channel.

VHT-STF 316 may be used to improve automatic gain control estimation in a MIMO transmission. VHT-LTFs 318 may be used for MIMO channel estimation and pilot subcarrier tracking. The preamble may include one VHT-LTF 318 for each spatial stream the preamble is transmitted on. VHT-SIG-A 314 may indicate to VHT-compatible APs 102 and STAs 104 that the PPDU is a VHT PPDU. VHT-SIG-A 314 includes signaling information and other information usable by STAs 104 to decode VHT-SIG-B 320. VHT-SIG-A 314 may indicate a bandwidth (BW) of the packet, the presence of space-time block coding (STBC), the number Nszs of space-time streams per user, a Group ID indicating the group and user position assigned to a STA, a partial association identifier that may combine the AID and the BSSID, a short guard interval (GI) indication, a single-user/multi-user (SU/MU) coding indicating whether convolutional or LDPC coding is used, a modulation and coding scheme (MCS), an indication of whether a beamforming matrix has been applied to the transmission, a cyclic redundancy check (CRC) and a tail. VHT-SIG-B 320 may be used for MU transmissions and may contain the actual data rate and MPDU or A-MPDU length values for each of the multiple STAs 104, as well as signaling information usable by the STAs 104 to decode data received in the DATA field 322, including, for example, an MCS and beamforming information.

Figure 3B:
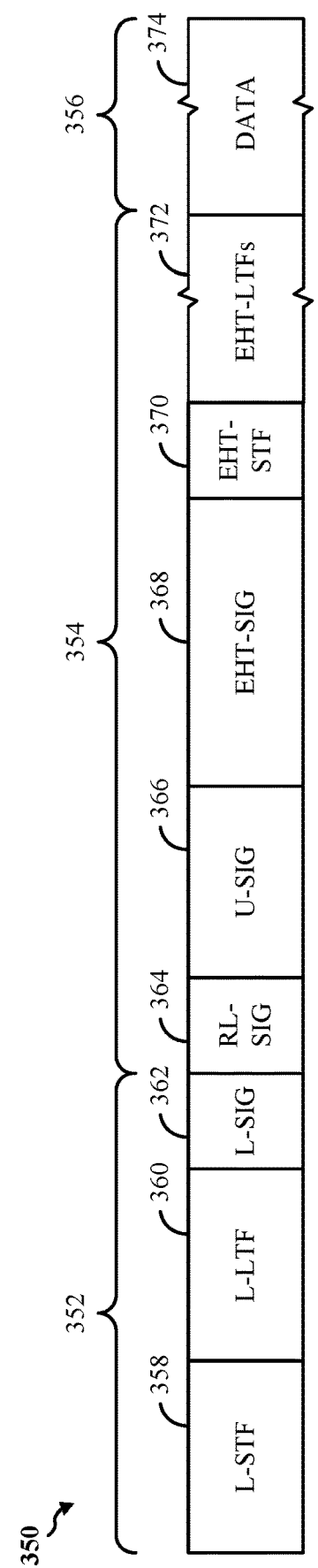
FIG. 3B shows another example PDU usable for communications between an AP and one or more STAs.

FIG. 3B shows another example PDU 350 usable for wireless communication between an AP and a number of STAs. The PDU 350 may be used for MU-OFDMA or MU-MIMO transmissions. The PDU 350 includes a PHY preamble including a first portion 352 and a second portion 354. The PDU 350 may further include a PHY payload 356 after the preamble, for example, in the form of a PSDU including a DATA field 374. The first portion 352 includes L-STF 358, L-LTF 360, and L-SIG 362. The second portion 354 of the preamble and the DATA field 374 may be formatted as a High Efficiency (HE) WLAN preamble and frame, respectively, in accordance with the IEEE 802.11ax amendment to the IEEE 802.11 wireless communication protocol standard. The second portion 354 includes a repeated legacy signal field (RL-SIG) 364, a first HE signal field (HE-SIG-A) 366, a second HE signal field (HE-SIG-B) 368 encoded separately from HE-SIG-A 366, an HE short training field (HE-STF) 370 and a number of HE long training fields (HE-LTFs) 372. Like L-STF 358, L-LTF 360, and L-SIG 362, the information in RL-SIG 364 and HE-SIG-A 366 may be duplicated and transmitted in each of the component 20 MHz subchannels in instances involving the use of a bonded channel. In contrast, HE-SIG-B 368 may be unique to each 20 MHz subchannel and may target specific STAs 104.

RL-SIG 364 may indicate to HE-compatible STAs 104 that the PPDU is an HE PPDU. An AP 102 may use HE-SIG-A 366 to identify and inform multiple STAs 104 that the AP has scheduled UL or DL resources for them. HE-SIG-A 366 may be decoded by each HE-compatible STA 104 served by the AP 102. HE-SIG-A 366 includes information usable by each identified STA 104 to decode an associated HE-SIG-B 368. For example, HE-SIG-A 366 may indicate the frame format, including locations and lengths of HE-SIG-Bs 368, available channel bandwidths, and modulation and coding schemes (MCSs), among other possibilities. HE-SIG-A 366 also may include HE WLAN signaling information usable by STAs 104 other than the number of identified STAs 104.

HE-SIG-B 368 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 368 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 374.

Figure 4:
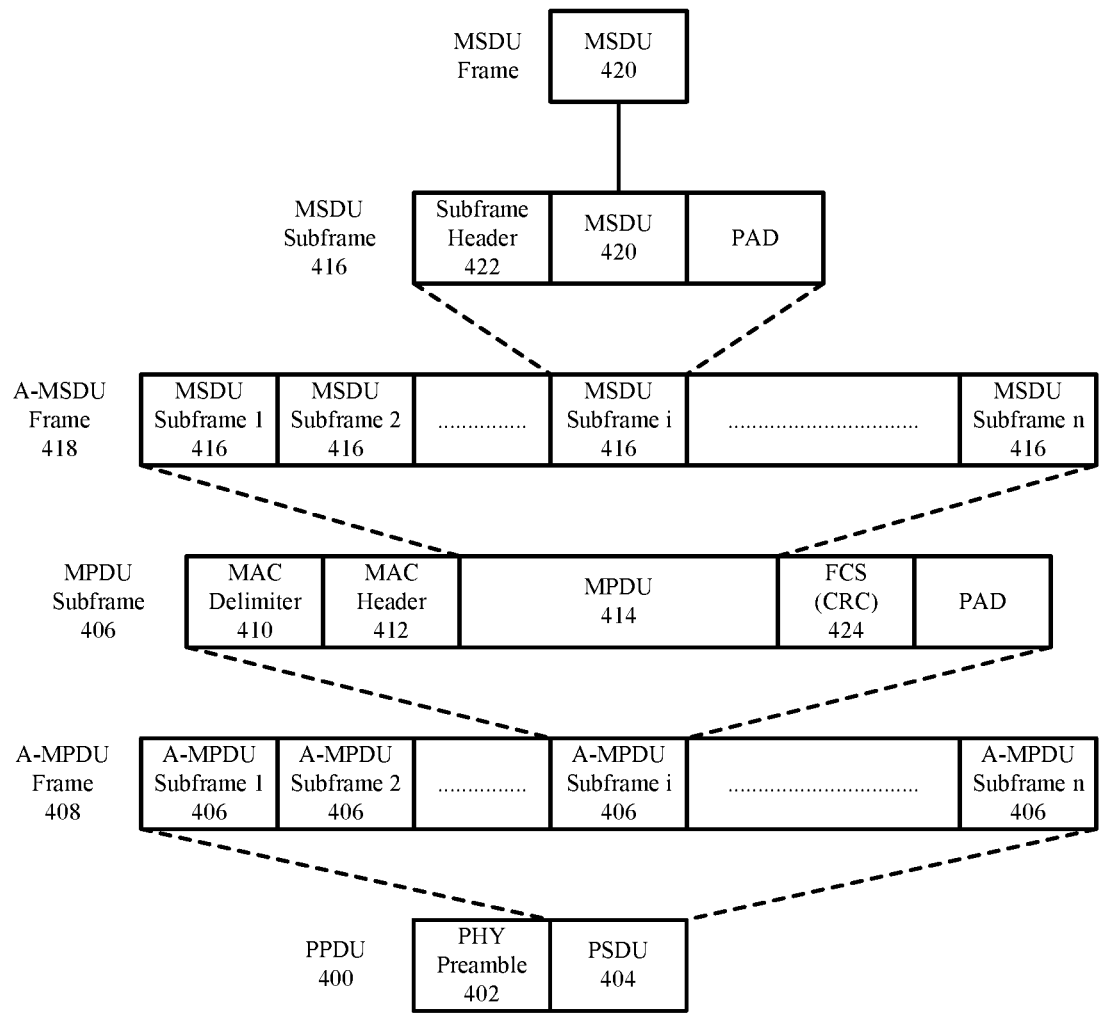
FIG. 4 shows an example physical layer convergence protocol (PLCP) protocol data unit (PPDU) usable for communications between an AP and one or more STAs.

FIG. 4 shows an example PPDU 400 usable for communications between an AP 102 and a number of STAs 104. As described herein, each PPDU 400 includes a PHY preamble 402 and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which comprises the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address or a destination address. The MAC header 412 may include a frame control field containing control information. The frame control field specifies the frame type, for example, a data frame, a control frame, or a management frame. The MAC header 412 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 also may include a frame check sequence (FCS) field 424 for error detection. For example, the FCS field 416 may include a cyclic redundancy check (CRC).

As described herein, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHZ, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

APs and STAs that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas. APs and STAs that include multiple antennas also may support space-time block coding (STBC). With STBC, a transmitting device also transmits multiple copies of a data stream across a number of antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams (described herein). The $N_{SS}$ spatial streams may be mapped to a number $N_{STS}$ of space-time streams, which are mapped to $N_{Tx}$ transmit chains.

APs and STAs that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are separately encoded and transmitted in parallel via the multiple $N_{Tx}$ transmit antennas. If the transmitting device includes $N_{Tx}$ transmit antennas and the receiving device includes $N_{Rx}$ receive antennas, the maximum number $N_{SS}$ of spatial streams that the transmitting device can simultaneously transmit to the receiving device is limited by the lesser of $N_{Tx}$ and $N_{Rx}$. In some implementations, the AP 102 and STAs 104 may be able to implement both transmit diversity as well as spatial multiplexing. For example, in instances in which the number $N_{SS}$ of spatial streams is less than the number $N_{Tx}$ of transmit antennas, the spatial streams may be multiplied by a spatial expansion matrix to achieve transmit diversity.

APs and STAs that include multiple antennas also may support beamforming. Beamforming refers to the focusing of the energy of a transmission in the direction of a target receiver. Beamforming may be used both in a single-user context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). To perform beamforming, a transmitting device, referred to as the beamformer, transmits a signal from each of multiple antennas. The beamformer configures the amplitudes and phase shifts between the signals transmitted from the different antennas such that the signals add constructively along particular directions towards the intended receiver, which is referred to as a beamformee. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. The beamformee may perform measurements for each of the $N_{Tx}$ x $N_{Rx}$ sub-channels corresponding to all of the transmit antenna and receive antenna pairs based on the sounding signal. The beamformee generates a feedback matrix based on the channel measurements and, typically, compresses the feedback matrix before transmitting the feedback to the beamformer. The beamformer may generate a precoding (or "steering") matrix for the beamformee based on the feedback and use the steering matrix to precode the data streams to configure the amplitudes and phase shifts for subsequent transmissions to the beamformee.

As described herein, a transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions by increasing the number of transmit antennas. This is especially advantageous in MU transmission contexts in which it is particularly important to reduce inter-user interference.

Figure 5:
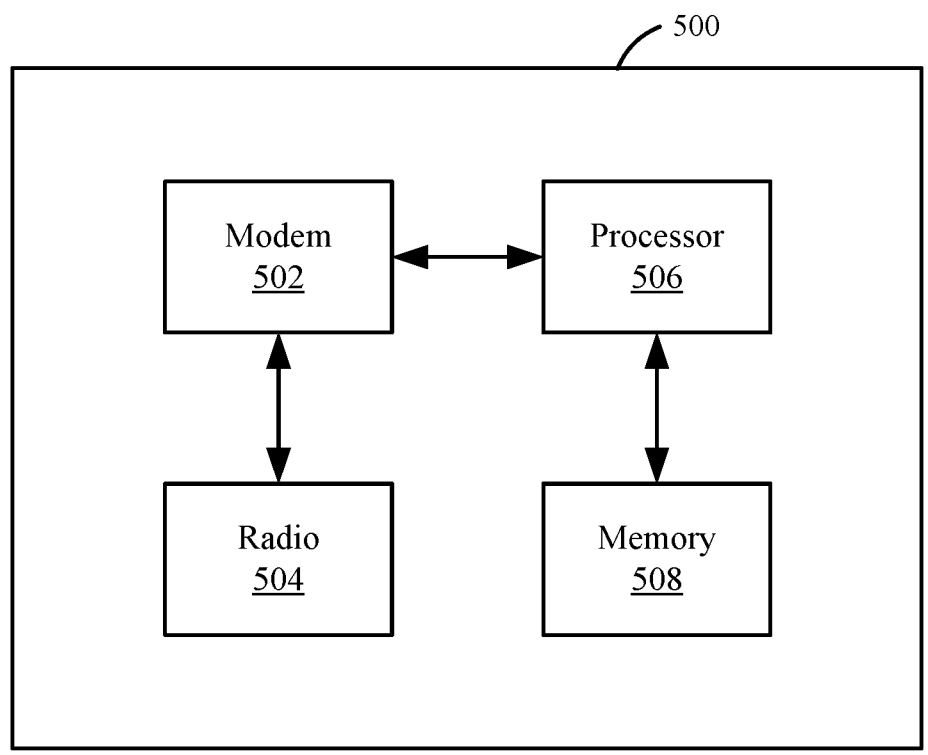
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described with reference to FIG. 1. In some implementations, the wireless communication device 500 can be an example of a device for use in an AP such as the AP 102 described with reference to FIG. 1. The wireless communication device 500 is capable of transmitting (or outputting for transmission) and receiving wireless communications (for example, in the form of wireless packets). For example, the wireless communication device can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, 802.11be and 802.11bf.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a 20AN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506") and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer and a demultiplexer. For example, while in a transmission mode, data obtained from the processor 506 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number Nszs of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 506) for processing, evaluation or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which transmits the symbols via the coupled antennas. Similarly, symbols received via the antennas are obtained by the radio 504, which provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described herein.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
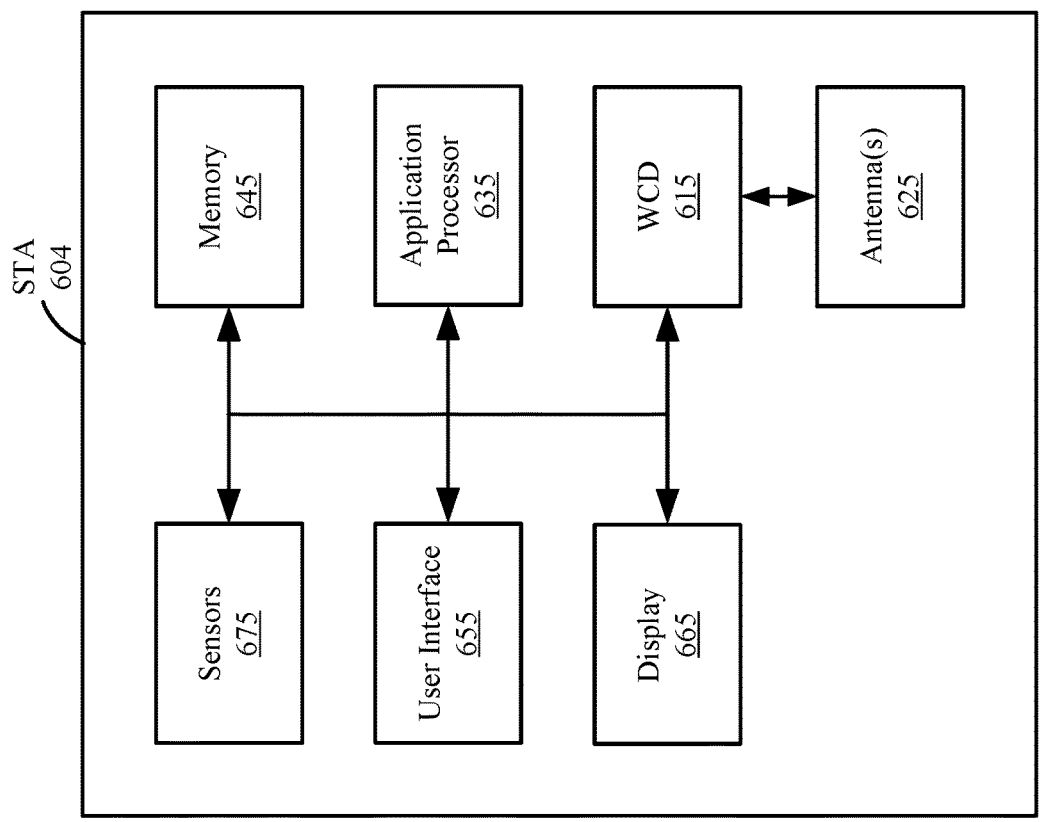
FIG. 6B shows a block diagram of an example STA.
Figure 6A:
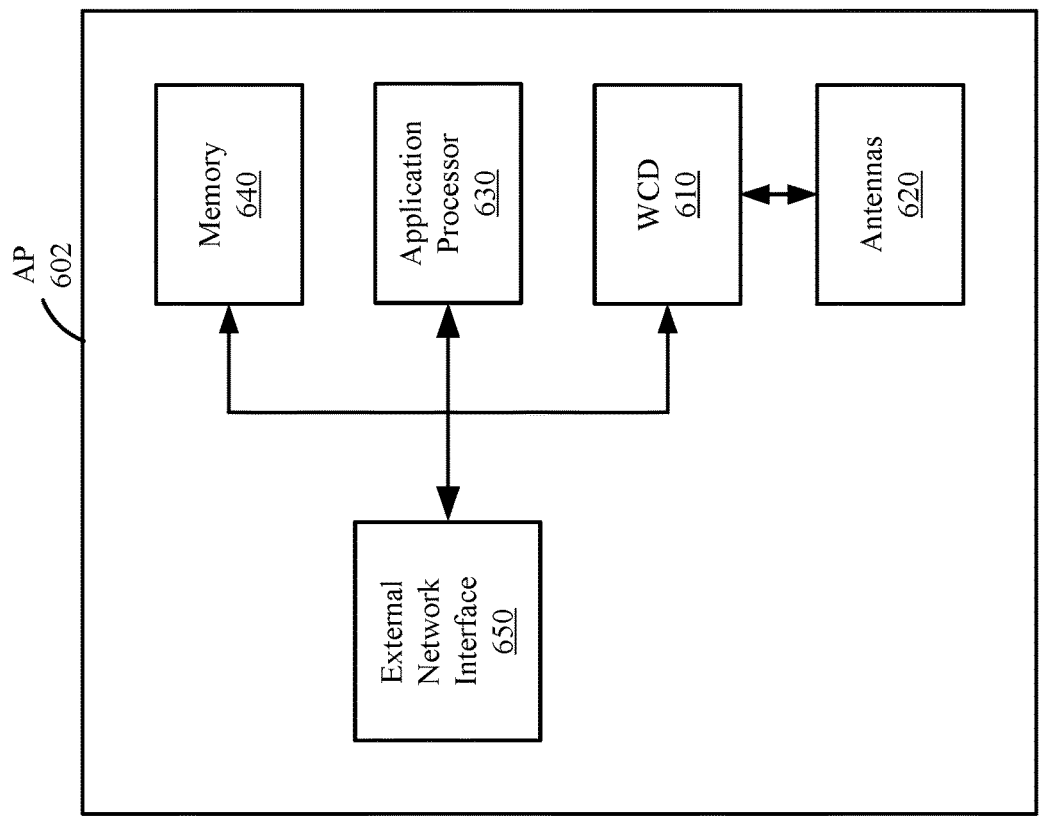
FIG. 6A shows a block diagram of an example AP.

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a 20AN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

Figure 7A:
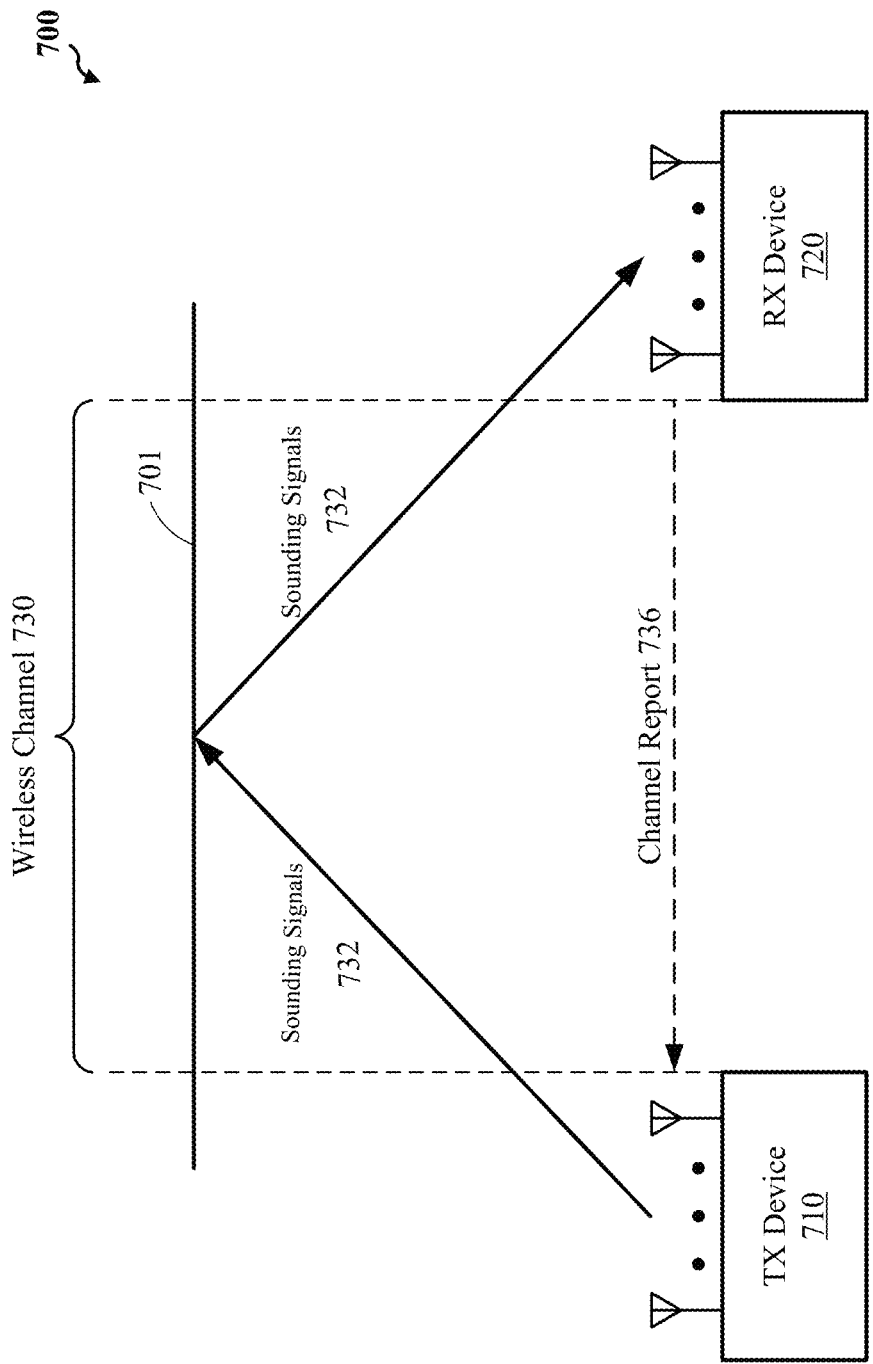
FIGS. 7A-7B show example radio frequency (RF) sensing systems.
Figure 7B:
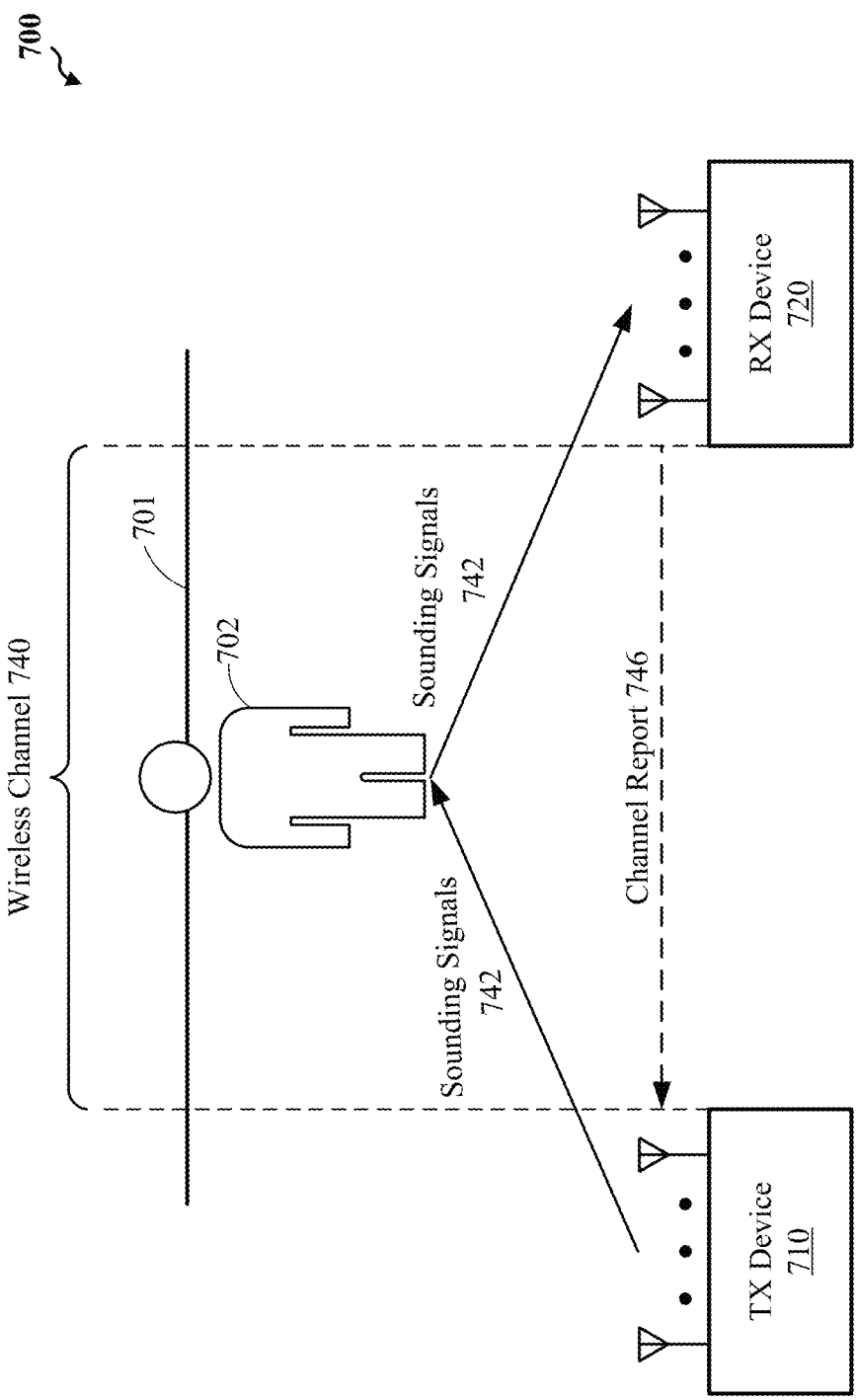

FIGS. 7A and 7B show an example RF sensing system 700. The RF sensing system 700 includes a transmitting (TX) device 710 and a receiving (RX) device 720. In some implementations, the transmitting device 710 may be one example of the AP 102 of FIG. 1 or the AP 602 of FIG. 6A, and the receiving device 720 may be one example of the STA 104 of FIG. 1 or the STA 604 of FIG. 6B. In some other implementations, the transmitting device 710 may be one example of the STA 104 of FIG. 1 or the STA 604 of FIG. 6B.

With reference to FIG. 7A, the transmitting device 710 is configured to transmit sounding signals 732, over a wireless channel 730, to the receiving device 720. Some sounding signals 732 may reflect off objects and surfaces in the environment before reaching the receiving device 720. As shown in FIG. 7A, a static object or surface 701 (such as a wall) is located along the path of the sounding signals 732. More specifically, the surface 701 reflects the sounding signals 732 in a direction of the receiving device 720. The receiving device 720 is configured to measure one or more characteristics of the wireless channel 730 based on the received sounding signals 732. For example, the sounding signals 732 may include one or more training fields (such as one or more of the LTFs described with reference to FIGS. 2, 3A, and 3B) that can be used for channel estimation. In some implementations, the receiving device 720 may transmit a channel report 736, based on the measured characteristics of the wireless channel 730, back to the transmitting device 710.

With reference to FIG. 7B, a new object 702 (such as a person) may enter the environment of the RF sensing system 700. The transmitting device 710 may transmit sounding signals 742, in the presence of the object 702, to the receiving device 720 over the wireless channel. The receiving device 720 measures one or more characteristics of a wireless channel 740 based on the received sounding signals 742. In comparison to FIG. 7A, the new object 702 may alter the propagation paths of at least some of the sounding signals transmitted by the transmitting device 710. For example, the phases or amplitudes of sounding signals 742 received in the presence of the object 702 (as shown in FIG. 7A) may be different than the phases or amplitudes of sounding signals 732 received in the absence of the object 702 (as shown in FIG. 7B). As a result, the wireless channel 740 may be different than the wireless channel 730 previously measured by the receiving device 720. In some implementations, the receiving device 720 may transmit a channel report 746, based on the measured characteristics of the wireless channel 740, back to the transmitting device 710.

The transmitting device 710 may detect a presence or movement of the object 702 based on differences or changes between the wireless channel 740 shown in FIG. 7B and the wireless channel 730 shown in FIG. 7A. For example, the transmitting device 710 may compare the characteristics of the wireless channel 740 (based on the channel report 746) with the characteristics of the wireless channel 730 (based on the channel report 736) to detect changes in the wireless channel. Assuming the transmitting device 710 and the receiving device 720 remain static (from FIG. 7A to FIG. 7B), the differences between wireless channel 730 and wireless channel 740 may be attributed to the presence or movement of the new object 702. Example characteristics that may be detectable based on the changes in the wireless channel include, but are not limited to, movement (or lack thereof) of an object, movement patterns (such as walking, falling, or gestures), object tracking (such as movement direction, range, or location), and vital signs (such as breathing).

As discussed, movement and other changes in an environment can be detected based on changes in a wireless channel or medium in the environment. Specifically, the presence or movement of objects in the environment may interfere with or otherwise alter the phase or amplitude of wireless communication signals transmitted over the wireless channel, and therefore may also change conditions on the wireless channel. As discussed, aspects of the present disclosure recognize that the accuracy, sensitivity, and coverage area of wireless sensing systems may increase as the number of wireless communication devices participating in the sensing operation increases. Thus, in some implementations, an initiator device may establish one or more measurement sessions with a plurality of wireless communication devices for sensing changes on or associated with a wireless channel in a coordinated manner. The initiator device may discover nearby wireless communication devices and exchange capabilities and other suitable information with the discovered devices. The initiator device may select one or more of the discovered devices to participate in a measurement exchange based at least in part on the capabilities of the initiator device and the capabilities of the selected devices. The initiator device may exchange or negotiate parameters and sounding schedules with the selected devices, and may employ one or more security protocols to ensure that wireless communications between the initiator device and the selected devices are secure and protected.

In some implementations, the initiator device may assign or allocate a unique Measurement Instance ID to each of the measurement instances of the measurement exchange. The Measurement Instance ID may be used to identify poll frames, trigger frames, sounding announcements, renewals of LTF keys, and measurement reports exchanged during or otherwise associated with the corresponding measurement instance. In some instances, the Measurement Instance ID of a respective measurement instance and the Measurement Setup ID identifying the sets of sensing parameters are carried in a field (such as the Dialog token field) in each of the poll frames, trigger frames, sounding announcements, and measurement reports associated with the respective measurement instance.

The initiator device can assign a transmitting device role or a receiving device role (or both transmitting device and receiving device roles) to one or more of the selected responder devices based on the capabilities of the responder devices. In some aspects, the initiator device can change the role assignments of the one or more selected responder devices at any suitable time. By providing a mechanism through which the initiator device can dynamically switch or update roles assigned to devices participating in the measurement exchange, aspects of the present disclosure may allow the initiator device to modify various aspects of the measurement instances based on changes detected in the environment, changes detected in one or more of the responder devices or the initiator device, or changes in the sets of sensing parameters.

Figure 8:
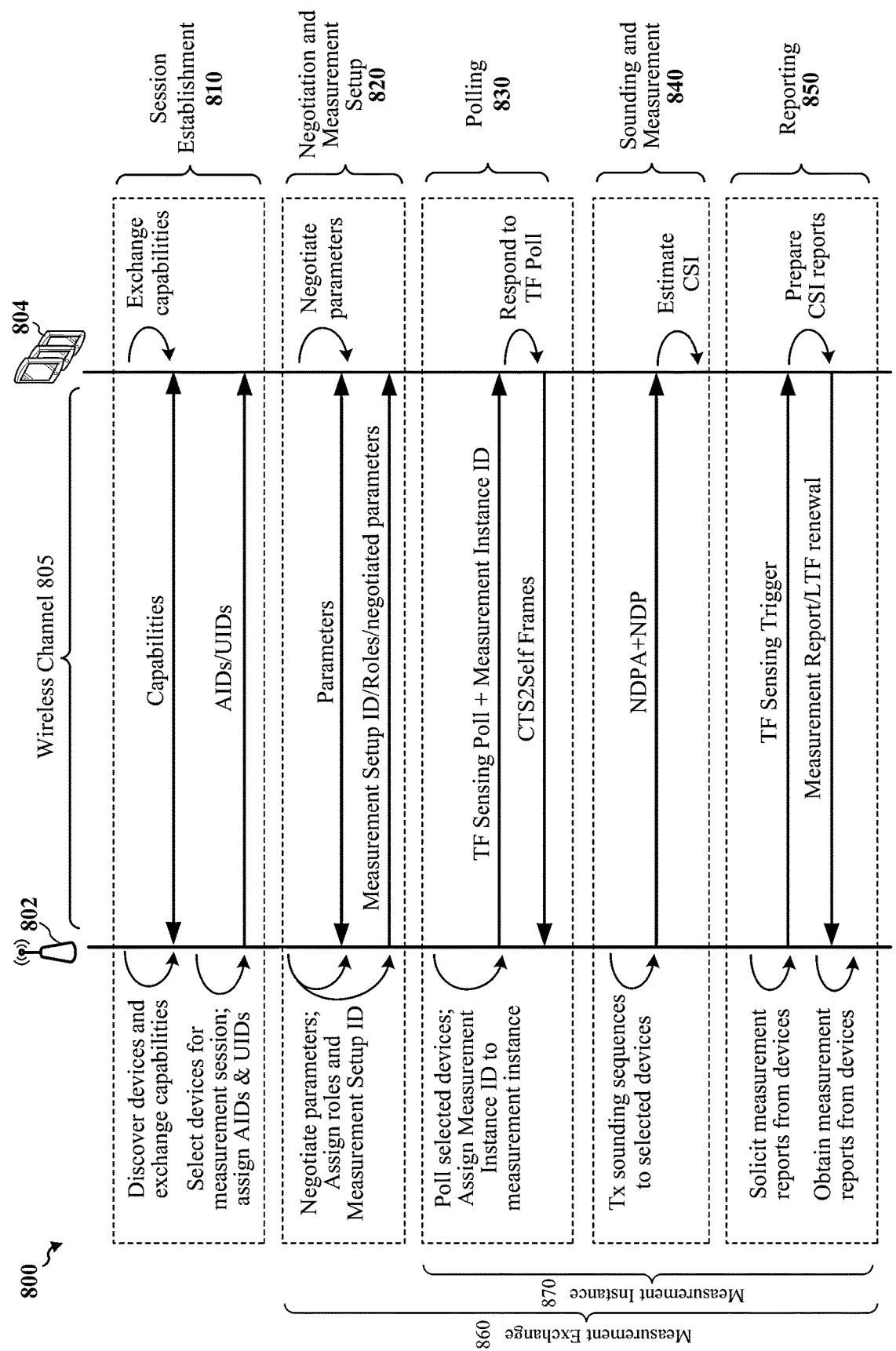
FIG. 8 shows a sequence diagram illustrating example sensing operations according to some implementations.

FIG. 8 shows a sequence diagram illustrating an example sensing operation 800 according to some implementations. The communications shown in the example of FIG. 8 are exchanged between an AP 802 operating as an initiator device and three STAs 804 operating as responder devices. In some implementations, the AP 802 may be one example of the APs 102 or 602 described with reference to FIGS. 1 and 6A, respectively, and the STAs 804 may be examples of the STAs 104 or 604 described with reference to FIGS. 1 and 6B, respectively. Although only three STAs are shown in FIG. 8 for simplicity, in other implementations, the sensing operation 800 can include other suitable numbers of responder devices, initiator devices, or both.

In some implementations, the measurement operation 800 may include a session establishment phase 810, a negotiation and measurement phase 820, a polling phase 830, a sounding and measurement phase 840, and a reporting phase 850. During the session establishment phase 810, the AP 802 may discover nearby wireless communication devices and separately exchange capabilities and other suitable information with the discovered wireless communication devices. In various implementations, the AP may establish a separate measurement session on one or more wireless channels with each of the discovered wireless communication devices based at least in part on the capabilities of the respective discovered wireless communication devices. In some instances, each measurement session may be identified by a medium access control (MAC) address and one of an association identifier (AID) or an unassociated identifier (UID) of the initiator device and a MAC address and one of an AID or a UID of the respective wireless communication device. The AP 802 may select one or more of the discovered wireless communication devices to participate in measurement exchanges based at least in part on the capabilities of the discovered wireless communication devices and the capabilities of the AP 802. The capabilities may include (but are not limited to) supported operating modes, supported transmission bandwidths, antenna configurations, a maximum number of space-time streams, extended range (ER) capabilities, and so on. In some instances, the capabilities of a respective device may also indicate processing times needed by the respective device to generate one or more types of measurement reports. In some implementations, the AP 802 may also consider the power save schedule of a respective device when determining whether (or not) to select the respective device to participate in the measurement exchange.

In the example of FIG. 8, the AP 802 selects the STAs 804 to participate in the measurement exchange as responder devices. Each STA 804 that is associated with the AP 802 may be identified or addressed by its corresponding AID, and each STA 804 that is not associated with the AP 802 may be identified or addressed by its corresponding UID. In some instances, the AP may also establish authentication protocols and security mechanisms during the session establishment 810. For example, in some aspects, the UIDs of unassociated STAs 804 may be derived or obtained from Pre-Association Security Negotiation (PASN).

The negotiation and measurement setup 820 begins with the AP negotiating various parameters with the selected STAs 804. The sets of parameters may include sensing parameters, transmit parameters, measurement parameters, or other parameters that can be used to define or setup the measurement exchanges. In some instances, the sensing parameters may indicate one or more of a transmission bandwidth of sounding sequences associated with a respective measurement instance, a duration of the measurement instances, the number of measurement instances associated with the measurement setup, or roles assigned to the responder devices. The transmit parameters may indicate the transmit power level used to transmit sounding sequences over the wireless channel, may indicate the number of spatial streams used to transmit the sounding sequences over the wireless channel, may indicate antenna configurations used to transmit the sounding sequences over the wireless channel, and may indicate phase shifts, cyclic shift delays (CSDs), estimated carrier frequency offsets (CFOs), or spatial mappings between the sounding sequences and the transmit antennas. The measurement parameters may indicate one or more types of measurement reports associated with the measurement setup, may indicate one or more measurement report formats associated with the measurement setup, and may indicate one or more times at which the measurement reports are to be transmitted to the AP 802.

The AP 802 may also assign roles to one or more of the STAs 804. In some implementations, the AP 802 may assign a role of transmitting device, a role of receiving device, or the roles of transmitting device and receiving device to one or more of the STAs 804. For example, in some instances, STAs assigned the role of transmitting device may be used to transmit sounding sequences (such as NDPs) over the wireless channel, and STAs assigned the role of receiving device may be used to estimate channel conditions or determine CSI responsive to the sounding sequences.

In some implementations, the AP 802 may assign a unique Measurement Setup ID to the sets of parameters negotiated between the AP 802 and each of the STAs 804. The Measurement Setup ID may also be used to identify the roles assigned to the selected STAs 804. In some aspects, the Measurement Setup ID may also be used to identify wireless communications associated with the negotiation and measurement setup 820 on the wireless channel.

In some implementations, the AP 802 may employ a pairwise key management protocol during authentication to confirm that the STAs 804 possess a pairwise master key (PMK). The PMK can be maintained during an entirety of the measurement session, and can be used to generate temporal keys that protect wireless communications between the AP 802 and the STAs 804. In some aspects, the AP 802 may employ a PASN mechanism that allows for frame protection and security prior to association. In this way, communications associated with the session establishment phase 810 and the negotiation and measurement setup phase 820 can be protected prior to (or without) association.

The measurement setup established on the wireless channel may include one or more measurement exchanges 860. Each measurement exchange 860 may include a negotiation and measurement setup 820 and any number of measurement instances 870. Each measurement instance 870 may include an instance of the polling phase 830, the sounding and measurement phase 840, and the reporting phase 850.

The polling phase 830 begins with the AP 802 polling the selected STAs 804 for a corresponding measurement instance 870 or measurement exchange 860. In some implementations, the AP 802 may assign or allocate a unique Measurement Instance ID to the corresponding measurement instance 870. The Measurement Instance ID may be used to identify poll frames, trigger frames, sounding announcements, renewals of LTF keys, and measurement reports exchanged during or otherwise associated with the corresponding measurement instance 870 of the measurement exchange 860. In some instances, the Measurement Instance ID of the measurement instance 870 and the Measurement Setup ID identifying the sets of sensing parameters may be carried in a field (such as the Dialog token field) in each of the poll frames, trigger frames, sounding announcements, and measurement reports associated with the respective measurement instance 870. As discussed, the Measurement Setup ID may identify the sets of parameters and the roles assigned to the selected STAs 804. In some aspects, all of the measurement instances 870 defined by or included within the measurement exchange 860 have the same Measurement Setup ID, for example, because all of the measurement instances 870 share the same sets of parameters.

In the example of FIG. 8, the AP 802 transmits a TF Sensing Poll frame over the wireless channel. The TF Sensing Poll frame may identify one or more of the STAs 804 for channel sounding and measurement. In some instances, the TF Sensing Poll frame may identify the STAs 804 by their respective AIDs or UIDs. The transmitter address (TA) field of the TF Sensing Poll frame may be configured to verify the AID or UID of the respective STA 804, and the receiver address (RA) field of the TF Sensing Poll frame may be set to a broadcast address. In some aspects, a control field of the TF Sensing Poll frame may indicate that the poll frame is of the Sensing type. In some implementations, the Measurement Instance ID of the corresponding measurement instance 870 and the Measurement Setup ID identifying the sets of parameters may be carried in a Dialog Token field of the TF Sensing Poll frame. In some other implementations, another suitable poll or trigger frame may be used to poll the STAs 804.

The STAs 804 receive the TF Sensing Poll frame transmitted by the AP 802, and respond by transmitting respective CTS2Self frames to the AP 802. The AP 802 may use reception of the CTS2Self frames to determine which of the identified STAs 804 are available for channel sounding and measurement.

The sounding and measurement phase 840 begins with the AP 802 transmitting one or more sounding sequences over the wireless channel to the identified STAs 804. The sounding sequences may be used by the identified STAs 804 to estimate channel conditions or determine channel state information (CSI) for the wireless channel. In some implementations, the AP 802 may transmit an NDPA, followed by an NDP, over the wireless channel to the identified STAs 804. The STAs 804 receive the sounding sequences (such as LTFs) carried by the NDP, and use the sounding sequences to determine channel conditions or CSI of the wireless channel.

The reporting phase 850 begins with the AP 802 soliciting channel information from the STAs 804. In some implementations, the AP 802 may transmit a TF Sensing Trigger frame over the wireless channel to the STAs 804. The TF Sensing Trigger frame may identify one or more of the STAs 804 to provide a measurement report to the AP 802. In some instances, the TF Sensing Trigger frame may identify the STAs 804 by their respective AIDs or UIDs. The TA field of the TF Sensing Trigger frame may be configured to verify the AID or UID of the respective STA 804, and the RA field of the TF Sensing Trigger frame may be set to a broadcast address. In some aspects, a control field of the TF Sensing trigger frame may indicate that the trigger frame is of the Sensing type. In some implementations, the Measurement Instance ID of the corresponding measurement instance and the Measurement Setup ID identifying the sets of parameters may be carried in a Dialog Token field of the TF Sensing Trigger frame. In some other implementations, another suitable trigger frame may be used to solicit the measurement reports from the STAs 804.

The STAs 804 receive the TF Sensing Trigger frame transmitted by the AP 802, and respond by transmitting measurement reports over the wireless channel to the AP 802. Each of the measurement reports may include or indicate the CSI determined by a corresponding STA 804 based on the NDP. In some instances, the measurement reports may include or indicate the receive parameters used by the respective STAs 804 to receive the NDP. Example receive parameters may include (but are not limited to) receive antenna indexes, automatic gain control (AGC) per receive chain, estimated CFO, received signal strength indication (RSSI) per antenna, or any spatial mapping of the sounding sequences to different receive antennas. In some implementations, each measurement report may include the Measurement Instance ID of the corresponding measurement instance and the Measurement Setup ID identifying the sets of sensing parameters. In some other implementations, the STAs 804 may transmit the measurement reports as unsolicited frames (such as without receiving a trigger frame) at one or more scheduled times established during the negotiation and measurement setup 820.

In some implementations, the AP 802 can change the roles assigned to the STAs 804 at any suitable time during the measurement exchange. For example, in some instances, the AP 802 may change the role assigned to a respective STA 804 based on changes in the environment, based on an absence of measurement reports obtained from the respective STA 804, or based on changes in the sets of sensing parameters. In some aspects, the AP 802 can remove one or more of the STAs 804 from the measurement setup at any suitable time during the measurement exchange. For example, in some instances, the AP 802 may detect a change in position or a change in the sets of parameters, and may remove the respective STA 804 from the measurement setup. In this way, STAs 804 that are not available or that are no longer able to support the established measurement setup can be removed from the measurement setup. In some other aspects, the AP 802 can add one or more other STAs 804 to the measurement setup. For example, in some instances, the AP 802 may determine whether one or more of the STAs 804 are unable to support the established measurement setup, and can add one or more other STAs 804 to the established measurement setup in response to determining that the one or more STAs 804 are unable to support the established measurement setup.

In some implementations, the AP 802 may also renew LTF keys with each of the STAs 804 during the measurement exchange. In some aspects, the LTF key renewals may be transmitted in frames (such as the measurement reports) that include a Dialogue Token field carrying the Measurement Instance ID of the corresponding measurement instance and the Measurement Setup ID identifying the sets of parameters.

In some other implementations, one of the STAs 804 may operate as the initiator device and use the AP 802 as a proxy to obtain measurement reports from the other STAs 804. For example, in some aspects, a first STA 804 may operate as the initiator device, the second and third STAs 804 may operate as responder devices, and the AP 802 may operate as a proxy for the first STA 804. In some aspects, the first STA 804 may delegate the session establishment 810 and the negotiation and measurement setup 820 to the AP 802. The first STA 804 may also delegate one or more aspects of the polling 830, the sounding and measurement 840, or the reporting 850 to the AP 802. For example, in some instances, the first STA 804 may instruct the AP 802 to transmit a poll frame over the wireless channel at the beginning of a respective measurement instance to determine whether the other STAs 804 are available. The first STA 804 may also instruct the AP 802 to transmit an NDPA, followed by an NDP, on the one or more wireless channels to the other STAs 804. The other STAs 804 may determine channel conditions or CSI based on the NDP, and may transmit measurement reports indicating the determined CSI to the AP 802. Then, the AP 802 may forward the measurement reports to the first STA 804.

In some other aspects, the first STA 804 may establish, negotiate, and setup the measurement exchange with the other STAs 804. Then, during the measurement exchange, the first STA 804 may instruct the AP 802 to obtain the measurement reports from the other STAs 804 on behalf of the first STA 804. In some other aspects, the first STA 804 may establish a tunneled direct link setup (TDLS) with one or more of the other STAs 804. Once the TDLS is established, the first STA 804 may perform measurement exchanges with the other STAs 804 using direct communication links (such as a P2P connection). In this way, the first STA 804 can obtain measurement reports indicative of channel conditions, or changes in channel conditions, without communicating through the AP 802.

In some other implementations, the AP 802 may instruct two or more of the STAs 804 to configure a TDLS between one another. Once the TDLS is configured, the two or more STAs 804 can perform measurement exchanges with each other via direct communication links. In this way, the two or more STAs 804 can perform channel sounding and obtain channel measurement reports from each other without communicating through the AP 802 and without providing the measurement reports to the AP 802.

Figure 9A:
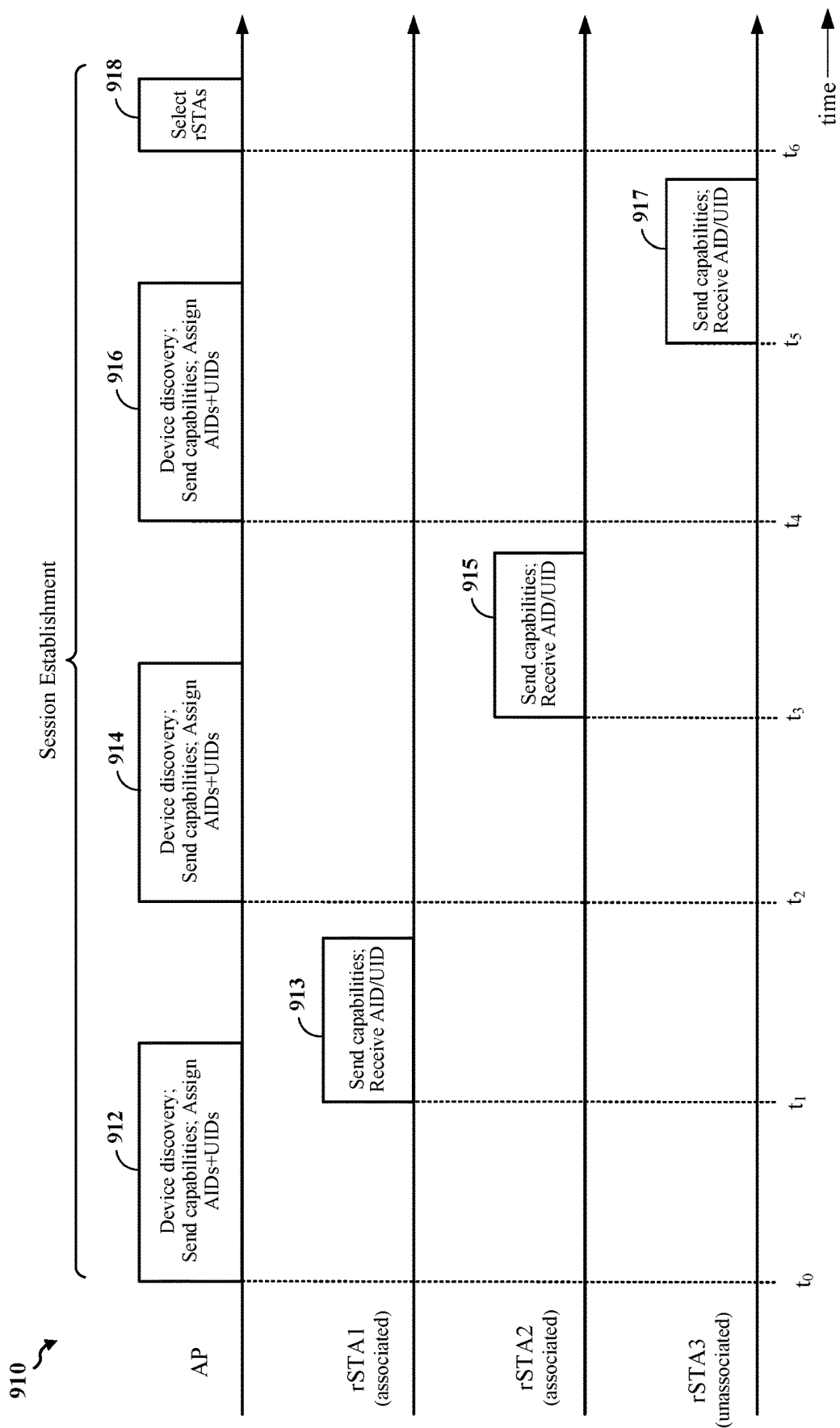
FIG. 9A shows a timing diagram illustrating an example session establishment according to some implementations.

FIG. 9A shows a timing diagram illustrating an example session establishment 910 according to some implementations. The communications shown in the example of FIG. 9A are exchanged between an AP operating as an initiator device and three wireless stations operating as responder devices rSTA1-rSTA3. In some implementations, the AP may be one example of the APs 102 or 602 described with reference to FIGS. 1 and 6A, respectively, and the responder devices rSTA1-rSTA3 may be examples of the STAs 104 or 604 described with reference to FIGS. 1 and 6B, respectively. In some other implementations, the AP may be one example of the AP 802 described with reference to FIG. 8, and the responder devices rSTA1-rSTA3 may be examples of the STAs 804 described with reference to FIG. 8. In some instances, the session establishment 910 may be one implementation of the session establishment 810 of FIG. 8. Although only three responder devices rSTA1-rSTA3 are shown in FIG. 9A for simplicity, in other implementations, the session establishment 910 can include other suitable numbers of responder devices (or initiator devices). For the example of FIG. 9A, rSTA1 and rSTA2 are associated with the AP, and rSTA3 is an unassociated STA.

At time $t_0$, the AP may discover a first responder device rSTA1, and may exchange (such as by sending) capabilities and other suitable information with the first responder device rSTA1 (912). The first responder device rSTA1 may exchange (such as by sending) capabilities with the AP at time $t_1$ (913). As discussed, the AP may assign AIDs to the STAs associated with it, and the AP may assign UIDs to the STAs not associated with it. In the example of FIG. 9A, the first responder device rSTA1 is associated with the AP, and the AP assigns a unique AID to rSTA1 (such as AID=101).

At time $t_2$, the AP may discover a second responder device rSTA2, and may exchange (such as by sending) capabilities and other suitable information with the second responder device rSTA2 (914). The second responder device rSTA2 may exchange (such as by sending) capabilities with the AP at time $t_3$ (915). In the example of FIG. 9A, the second responder device rSTA2 is associated with the AP, and the AP assigns a unique AID to rSTA2 (such as AID=102).

At time $t_4$, the AP may discover a third responder device rSTA3, and may exchange (such as by sending) capabilities and other suitable information with the third responder device rSTA3 (916). The third responder device rSTA3 may exchange (such as by sending) capabilities with the AP at time $t_5$ (917). In the example of FIG. 9A, the third responder device rSTA3 is not associated with the AP, and the AP assigns a unique UID to rSTA3. In some aspects, the UID of rSTA3 may be derived or obtained from a PASN.

At time to, the AP selects the three responder devices rSTA1-rSTA3 to participate in a measurement exchange based at least in part on the capabilities of rSTA1-rSTA3 and the capabilities of the AP (918). As discussed, the capabilities may include (but are not limited to) supported operating modes, supported transmission bandwidths, antenna configurations, a maximum number of space-time streams, ER capabilities, and so on. In some implementations, the capabilities of a respective device (such as the AP or the responder devices rSTA1-rSTA3) may also indicate processing times needed by the respective device to generate one or more types of measurement reports. In some other implementations, the AP may also consider the power save schedule of a respective device when determining whether (or not) to select the respective device to participate in the measurement exchange.

Figure 9B:
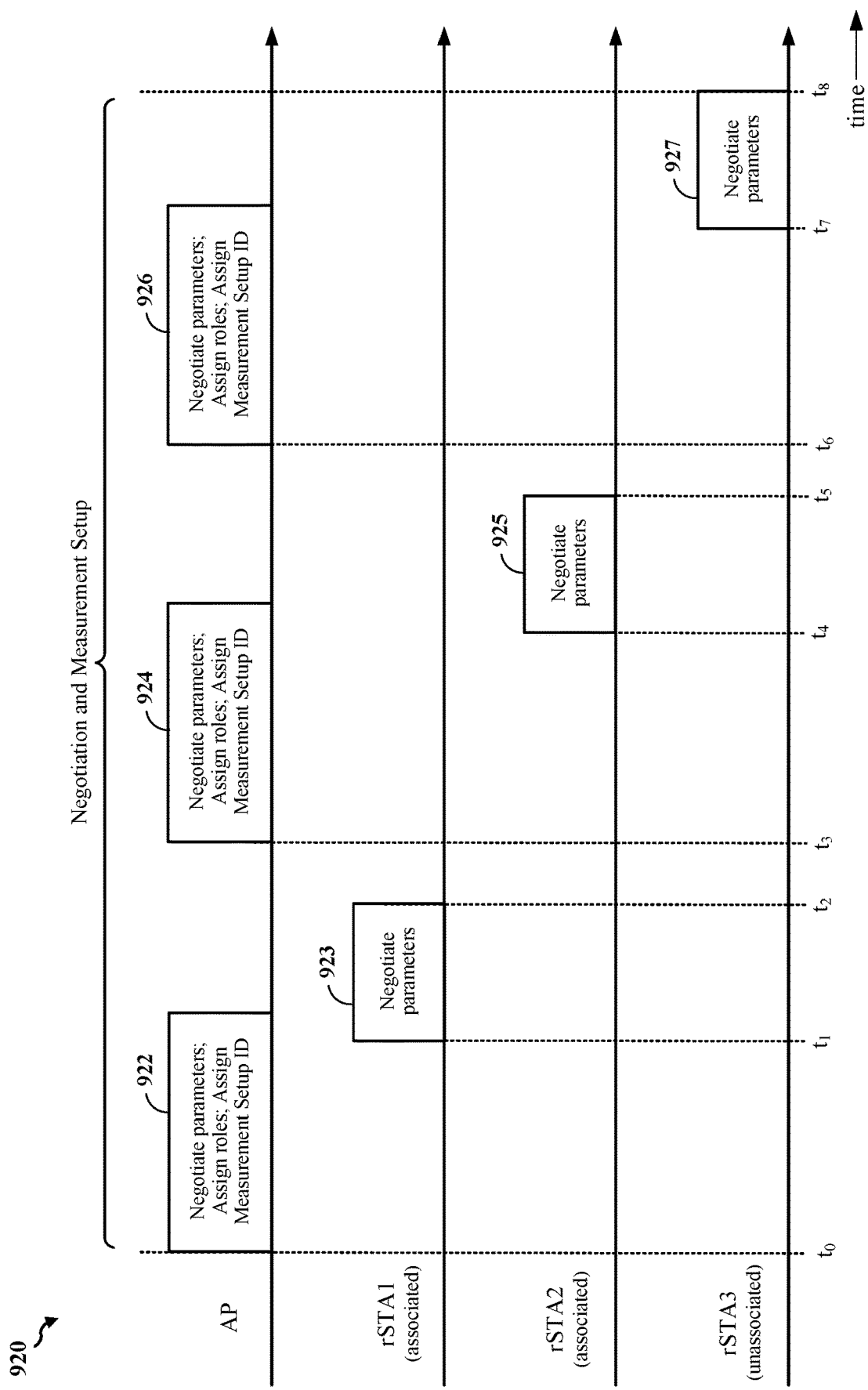
FIG. 9B shows a timing diagram illustrating an example negotiation and measurement setup according to some implementations.

FIG. 9B shows a timing diagram illustrating an example negotiation and measurement 920 according to some implementations. The communications shown in the example of FIG. 9B are exchanged between the AP and the responder devices rSTA1-rSTA3 described with reference to FIG. 9A. In some implementations, the negotiation and measurement setup 920 may be one implementation of the negotiation and measurement setup 820 of FIG. 8.

During the negotiation and measurement setup 920, the AP separately negotiates various parameters with the responder devices rSTA1-rSTA3 selected for participation in the measurement exchange. As discussed, each set of parameters may include sensing parameters, transmit parameters, measurement parameters, or other parameters that can be used to define or setup the measurement exchanges. In some instances, the sensing parameters may indicate one or more of a transmission bandwidth of sounding sequences associated with a respective measurement instance, a duration of the measurement instances, the number of measurement instances associated with the measurement setup, or roles assigned to the responder devices. The transmit parameters may indicate the transmit power level used to transmit sounding sequences over the wireless channel, may indicate the number of spatial streams used to transmit the sounding sequences over the wireless channel, may indicate antenna configurations used to transmit the sounding sequences over the wireless channel, and may indicate phase shifts, cyclic shift delays (CSDs), estimated carrier frequency offsets (CFOs), or spatial mappings between the sounding sequences and the transmit antennas. The measurement parameters may indicate one or more types of measurement reports associated with the measurement setup, may indicate one or more measurement report formats associated with the measurement setup, and may indicate one or more times at which the measurement reports are to be transmitted to the AP 802.

Specifically, between times to and $t_2$, the AP negotiates one or more sets of sensing parameters with the first responder device rSTA1, and assigns one or more roles to the first responder device rSTA1. The AP assigns the Measurement setup ID to identify the set of sensing parameters and roles (922, 923). Between times $t_3$ and $t_5$, the AP negotiates one or more sets of sensing parameters with the second responder device rSTA2, and assigns one or more roles to the second responder device rSTA2. The AP assigns the Measurement setup ID to identify the one or more sensing parameters and roles (924, 925). Between times to and $t_5$, the AP negotiates one or more sets of sensing parameters with the third responder device rSTA3, and assigns one or more roles to the third responder device rSTA3. The AP assigns the Measurement setup ID to identify the sets of sensing parameters and roles (926, 927). In some aspects, measurement setups with rSTA1-rSTA3 response devices identified with the same Measurement Setup ID can be used in measurement instances simultaneously with all rSTA1-rSTA3.

In some implementations, the AP may employ a pairwise key management protocol during authentication to confirm that the responder devices rSTA1-rSTA3 possess a pairwise master key (PMK). The PMK can be maintained during an entirety of the measurement session, and can be used to generate temporal keys that protect wireless communications between the AP and the responder devices rSTA1-rSTA3. In some aspects, the AP may employ a PASN mechanism that allows for frame protection and security prior to association. In this way, communications associated with the negotiation and measurement setup phase 920, as well as the session establishment phase 910 of FIG. 9A, can be protected prior to (or without) association.

Figure 10A:
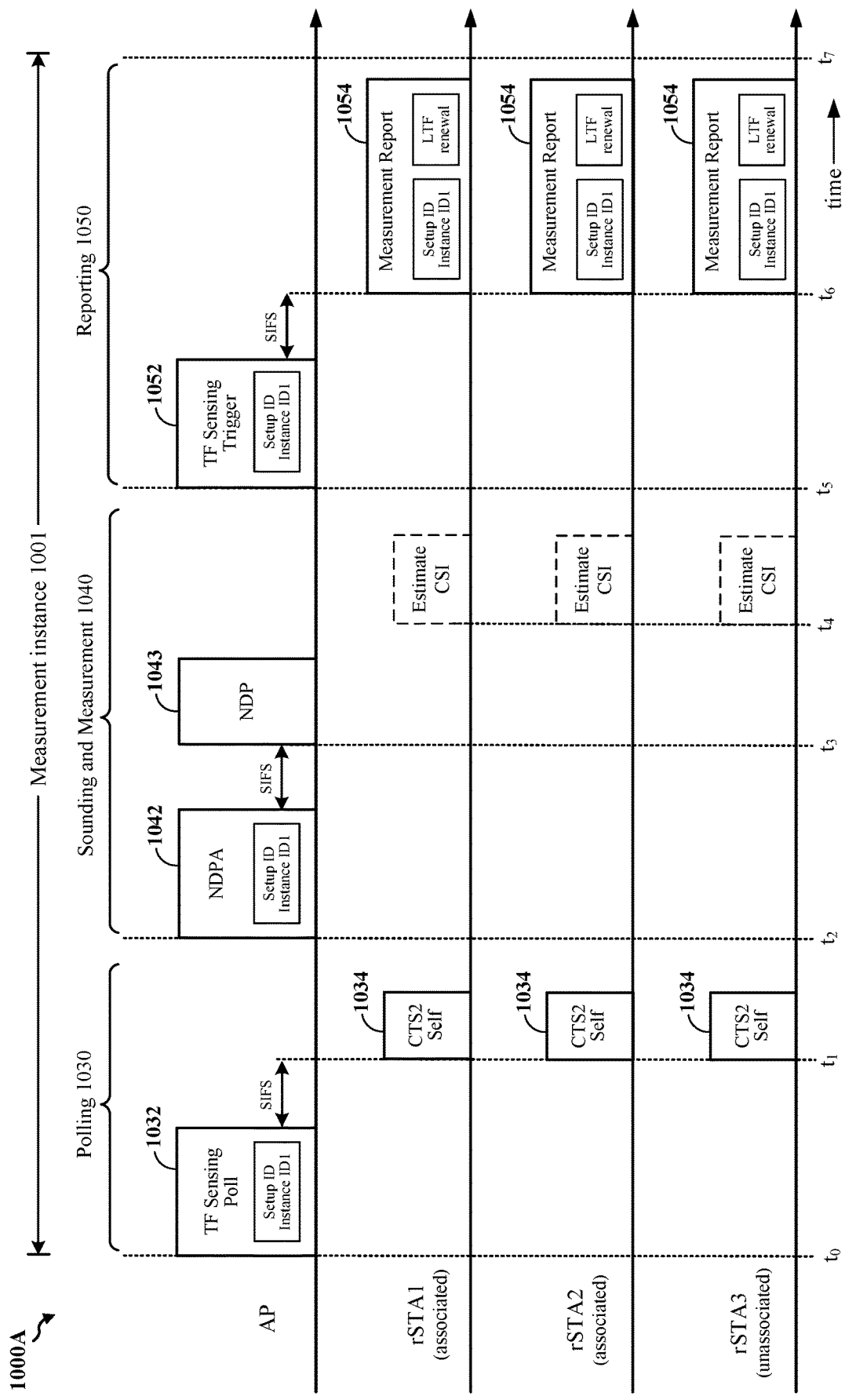
FIG. 10A shows a timing diagram illustrating an example measurement instance according to some implementations.

FIG. 10A shows a timing diagram illustrating an example measurement exchange 1000A according to some implementations. The communications shown in the example of FIG. 10A are exchanged between the AP and the responder devices rSTA1-rSTA3 described with reference to FIGS. 9A and 9B. The measurement exchange 1000A is shown to include one measurement instance 1001 including a polling phase 1030, a sounding and measurement phase 1040, and a reporting phase 1050 (the negotiation and measurement setup associated with the measurement instance 1001 of the measurement exchange 1000A is not shown in FIG. 10A for simplicity). In some implementations, the polling phase 1030 may be one implementation of the polling phase 830 of FIG. 8, the sounding and measurement phase 1040 may be one implementation of the sounding and measurement phase 840 of FIG. 8, and the reporting phase 1050 may be one implementation of the reporting phase 850 of FIG. 8. In some aspects, the measurement instance 1001 associated with the polling phase 1030, the sounding and measurement phase 1040, and the reporting phase 1050 may be one implementation of the measurement instance described with reference to FIG. 8.

In some implementations, the AP may identify the responder devices rSTA1-rSTA3 using their MAC addresses and their respective AIDs or UIDs. Communication sessions between the AP and each of the associated responder devices rSTA1-rSTA2 may be identified by the respective responder device's AID and the AP's default AID=0 (or also based on the MAC addresses). Communication sessions between the AP and the unassociated responder device rSTA3 may be identified by rSTA3's UID and the AP's default AID=0.

At time to, the polling phase 1030 begins with the AP transmitting a TF Sensing Poll frame 1032 over the wireless channel to the responder devices rSTA1-rSTA3. The TF Sensing Poll frame 1032 may identify one or more of the responder devices rSTA1-rSTA3 for channel sounding and measurement. In some instances, the TF Sensing Poll frame 1032 may identify the responder devices rSTA1-rSTA3 by their respective AIDs or UIDs. The TA field of the TF Sensing Poll frame 1032 may be configured to verify the AID or UID of each identified rSTA, and the RA field of the TF Sensing Poll frame 1032 may be set to a broadcast address. In some aspects, a control field of the TF Sensing Poll frame 1032 may indicate that the TF Sensing Poll frame 1032 is of the Sensing type. In some implementations, the Measurement Instance ID of the corresponding measurement instance 1001 and the Measurement Setup ID identifying the sets of sensing parameters may be carried in a Dialog Token field of the TF Sensing Poll frame 1032. In some other implementations, another suitable poll or trigger frame may be used to poll the responder devices rSTA1-rSTA3.

The responder devices rSTA1-rSTA3 receive the TF Sensing Poll frame 1032 transmitted by the AP, and respond by transmitting respective CTS2Self frames 1034 on the same one or more wireless channels to the AP. In some instances, the responder devices rSTA1-rSTA3 transmit the CTS2Self frames 1034 to the AP within a SIFS duration after receiving the TF Sensing Poll frame 1032. The AP may use reception of the CTS2Self frames 1034 to determine which of the identified responder devices rSTA1-rSTA3 are available for channel sounding and measurement.

At time $t_2$, the sounding and measurement 1040 begins with the AP transmitting a null data packet announcement (NDPA) 1042 on the one or more wireless channels to the responder devices rSTA1-rSTA3, followed by a null data packet (NDP) 1043 at time $t_3$. Transmissions of the NDPA 1042 and the NDP 1043 may be separated by a SIFS duration. The NDPA 1042 may announce the transmission of the NDP 1042 that follows the NDPA 1043, and may identify each of the responder devices rSTA1-rSTA3. In some implementations, the NDPA 1042 may identify rSTA1 and rSTA2 by their respective AIDs, and may identify rSTA3 by its UID. In some instances, the TA field of the NDPA 1042 may be configured to verify the AID or UID of each of the responder devices rSTA1-rSTA3. In some other instances, the RA field of the NDPA 1042 may be set to a broadcast address.

In some implementations, the NDPA 1042 may include the Measurement Instance ID of the corresponding measurement instance 1001 and the Measurement Setup ID assigned to the set of parameters. The Measurement Instance ID and the Measurement Setup ID may be carried in a Dialogue Token field of the NDPA 1042. In some instances, a control field of the NDPA 1042 may indicate that the NDPA 1042 is an NDP Announcement frame of the Sensing type.

In some other implementations, the NDPA 1042 may indicate a type of measurement report requested by the AP. For example, in some instances, the type of measurement report may be one of a compressed beamforming report (CBR), a measurement report including uncompressed CSI, a measurement report including normalized CSI, a measurement report including CSI processed with the transmit parameters, or a measurement report including CSI processed with one or more receive parameters used by the responder devices rSTA1-rSTA3 to receive the NDP 1043.

The NDP 1043 may carry one or more sounding sequences configured for obtaining channel state information (CSI) of the wireless channel. In some instances, the NDP 1043 may include a plurality of LTFs configured for channel estimation. Each of the responder devices rSTA1-rSTA3 receives the NDP 1043 transmitted by the AP, and estimates channel conditions or determines CSI of the wireless channel based on the sounding sequences carried in the NDP 1043, at or around time $t_4$.

At time $t_5$, the reporting 1050 begins with the AP transmitting a TF Sensing Trigger frame 1052 on the one or more wireless channels to the responder devices rSTA1-rSTA3. The TF Sensing Trigger frame 1052 may identify each of the responder devices rSTA1-rSTA3, and may solicit measurement reports from the identified responder devices rSTA1-rSTA3. In some implementations, the TF Sensing Trigger frame 1052 may identify rSTA1 and rSTA2 by their respective AIDs, and may identify rSTA3 by its UID. In some instances, the TA field of the TF Sensing Trigger frame 1052 may be configured to verify the AID or UID of each of the responder devices rSTA1-rSTA3. In some other instances, the RA field of the TF Sensing Trigger frame 1052 may be set to a broadcast address.

In some implementations, the TF Sensing Trigger frame 1052 may include the Measurement Instance ID of the corresponding measurement instance 1001 and the Measurement Setup ID assigned to the set of the parameters. The Measurement Instance ID and the Measurement Setup ID may be carried in a Dialogue Token field of the TF Sensing Trigger frame 1052. In some instances, a control field of the TF Sensing Trigger frame 1052 may indicate that the TF Sensing Trigger frame 1052 is of the Sensing type.

In response to receiving the TF Sensing Trigger frame 1052, the responder devices rSTA1-rSTA3 transmit respective measurement reports 1054 over the one or more wireless channels to the AP, at time to. Each of the measurement reports 1054 may include or indicate the CSI determined by a corresponding responder device based on the NDP 1043. In some implementations, each of the measurement reports 1054 may include the Measurement Instance ID of the corresponding measurement instance 1001 and the Measurement Setup ID identifying the set of the sensing parameters. The Measurement setup ID may identify the type and format of the report included in the measurement reports 1054. The Measurement Instance ID and the Measurement Setup ID may be carried in a Dialog Token field of each of the measurement reports 1054. In some aspects, the measurement reports 1054 may be aggregated and transmitted to the AP in a MU UL PPDU.

In some instances, the measurement reports 1054 may include or indicate the receive parameters used by the respective responder devices rSTA1-rSTA3 to receive the NDP 1043. Example receive parameters may include (but are not limited to) receive antenna indexes, automatic gain control (AGC) per receive chain, estimated CFO, received signal strength indication (RSSI) per antenna, or any spatial mapping of the sounding sequences to different receive antennas. In some other instances, the measurement reports 1054 may include or indicate renewals of the LTF keys associated with each of the responder devices rSTA1-rSTA3.

In some other implementations, the responder devices rSTA1-rSTA3 may transmit the measurement reports 1054 as unsolicited frames (such as without receiving a trigger frame) at one or more times scheduled during the negotiation and measurement setup of the measurement exchange.

Figure 10B:
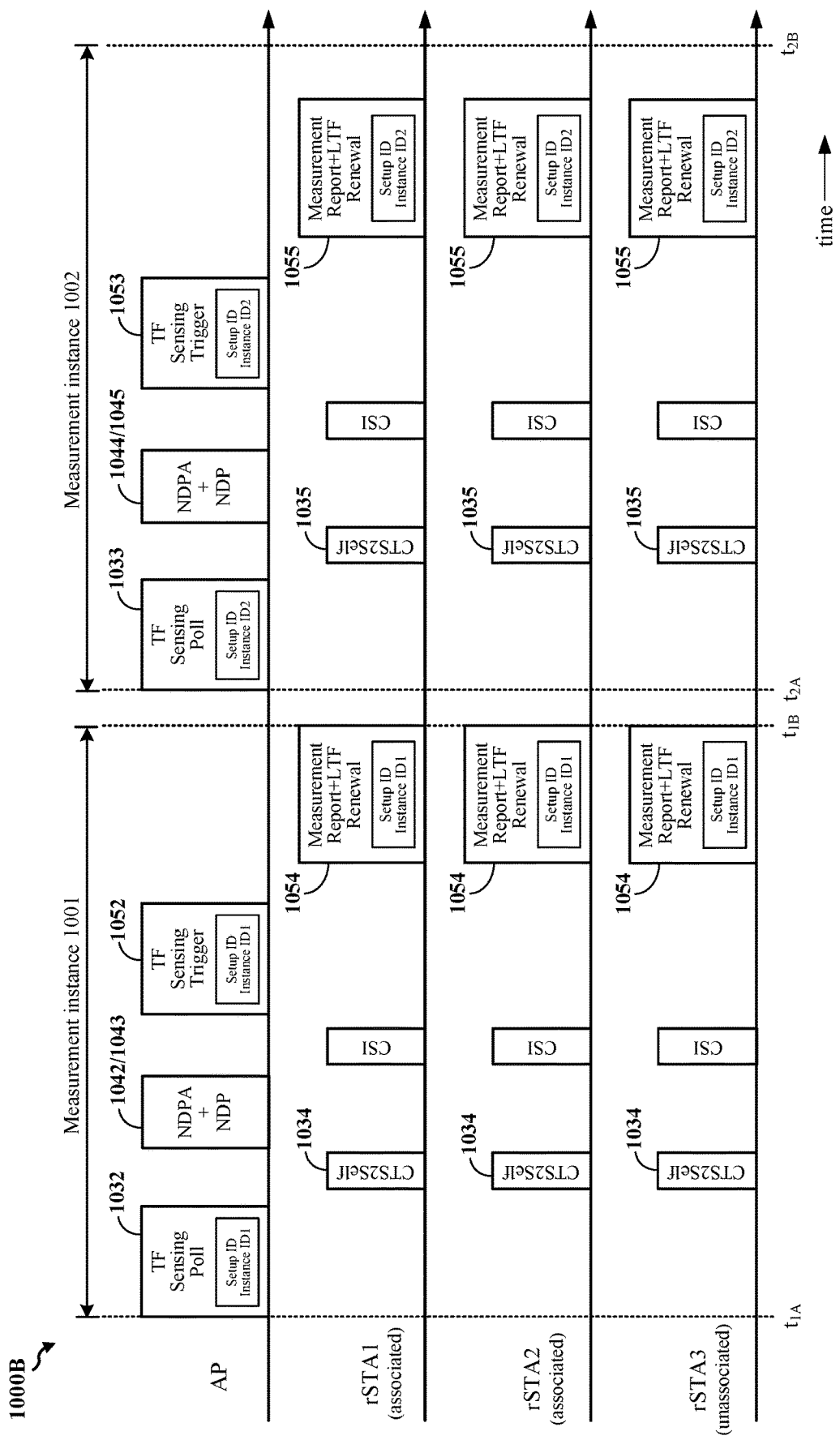
FIG. 10B shows a timing diagram illustrating an example measurement instance according to some other implementations.

FIG. 10B shows a timing diagram illustrating an example measurement exchange 1000B according to some other implementations. The communications shown in the example of FIG. 10B are exchanged between the AP and the responder devices rSTA1-rSTA3 described with reference to FIG. 10A. The measurement exchange 1000B is shown to include a first measurement instance 1001 and a second measurement instance 1002. In some implementations, the first and second measurement instances 1001 and 1002 of FIG. 10B may be examples of the first measurement instance 1001 of FIG. 10A. That is, although not shown in FIG. 10B for simplicity, each of the first and second measurement instances 1001 and 1002 of the measurement exchange 1000B may include a polling phase 1030, a sounding and measurement phase 1040, and a reporting phase 1050 described with reference to FIG. 10A. For simplicity, the negotiation and measurement setup associated with the first and second measurement instances 1001 and 1002 of the measurement exchange 1000B is not shown in FIG. 10B. In some other implementations, each of the first and second measurement instances 1001 and 1002 may include a polling phase 830, a sounding and measurement phase 840, and a reporting phase 850 described with reference to FIG. 8.

As discussed, the AP may associate a Measurement Setup ID with the measurement exchange 1000B to identify the sets of parameters to be used for the first and second measurement instances 1001 and 1002 may be assigned a Measurement Setup ID by the AP. As discussed above, the Measurement Setup ID may be used to identify the parameters, report type, and sounding schedule associated with the measurement instances and/or to identify the roles assigned to the devices participating in the measurement exchange.

In some implementations, the AP may assign a first Measurement Instance ID (such as ID1) to the first measurement instance 1001, and may assign a second Measurement Instance ID (such as ID2) to the second measurement instance 1002. The first Measurement Instance ID may be used to identify the poll frames 1032, NDPAs 1042, NDPs 1043, trigger frames 1052, and measurement reports 1054 associated with the first measurement instance 1001. The second Measurement Instance ID may be used to identify the poll frames 1033, NDPAs 1044, NDPs 1045, trigger frames 1053, and measurement reports 1055 associated with the second measurement instance 1002.

In some implementations, each of the TF Sensing Poll frame 1032 transmitted by the AP, the NDPA 1042 transmitted by the AP, the TF Sensing Trigger frame 1052 transmitted by the AP, and the measurement reports 1054 transmitted by the responder devices rSTA1-rSTA3 between times $t_{1A}$ and $t_{1B}$ (corresponding to the first measurement instance 1001) may include a Dialogue Token field that carries the first Measurement Instance ID (ID1) and the Measurement Setup ID that identifies the sets of parameters associated with the measurement exchange 100B. Similarly, each of the TF Sensing Poll frame 1033 transmitted by the AP, the NDPA 1044 transmitted by the AP, the TF Sensing Trigger frame 1053 transmitted by the AP, and the measurement reports 1055 transmitted by the responder devices rSTA1-rSTA3 between times $t_{2A}$ and $t_{2B}$ (corresponding to the second measurement instance 1002) may include a Dialogue Token field that carries the second Measurement Instance ID (ID2) and the Measurement Setup ID that identifies the sets of parameters associated with the measurement exchange 100B. In this way, the AP and the responder devices rSTA1-rSTA3 can identify and distinguish wireless communications associated with the first measurement instance 1001 from wireless communications associated with the second measurement instance 1002, irrespective of the order in which such wireless communications are transmitted or received.

In some aspects, the poll frames, sounding frames, trigger frames, and measurement reports associated with the first measurement instance 1001 carry the same Measurement Setup ID as the poll frames, sounding frames, trigger frames, and measurement reports associated with the second measurement instance 1002. In some other aspects, the poll frames, sounding frames, trigger frames, and measurement reports associated with the first measurement instance 1001 carry a different Measurement Setup ID than the poll frames, sounding frames, trigger frames, and measurement reports associated with the second measurement instance 1002.

In some other implementations, the responder device rSTA3 may not be able to determine the CSI associated with the first measurement instance 1001 until after time $t_{2A}$ (which occurs during the second measurement instance 1002). As such, the responder device rSTA3 may not be able to transmit its measurement report 1054 indicating the CSI responsive to the NDP 1042 until the second measurement instance 1002). Applicant recognizes that transmission of the measurement report 1054 (which indicates CSI responsive to sounding sequences received during the first measurement instance 1001) during the second measurement instance 1002 may result in out-of-order measurement reporting. Thus, by carrying the first Measurement Instance ID (ID1) in the measurement report 1054 (such as in the Dialogue token field of the measurement report 1054), the AP can determine that the measurement report 1054 is associated with the first measurement instance, rather than the second measurement instance 1002.

Figure 11:
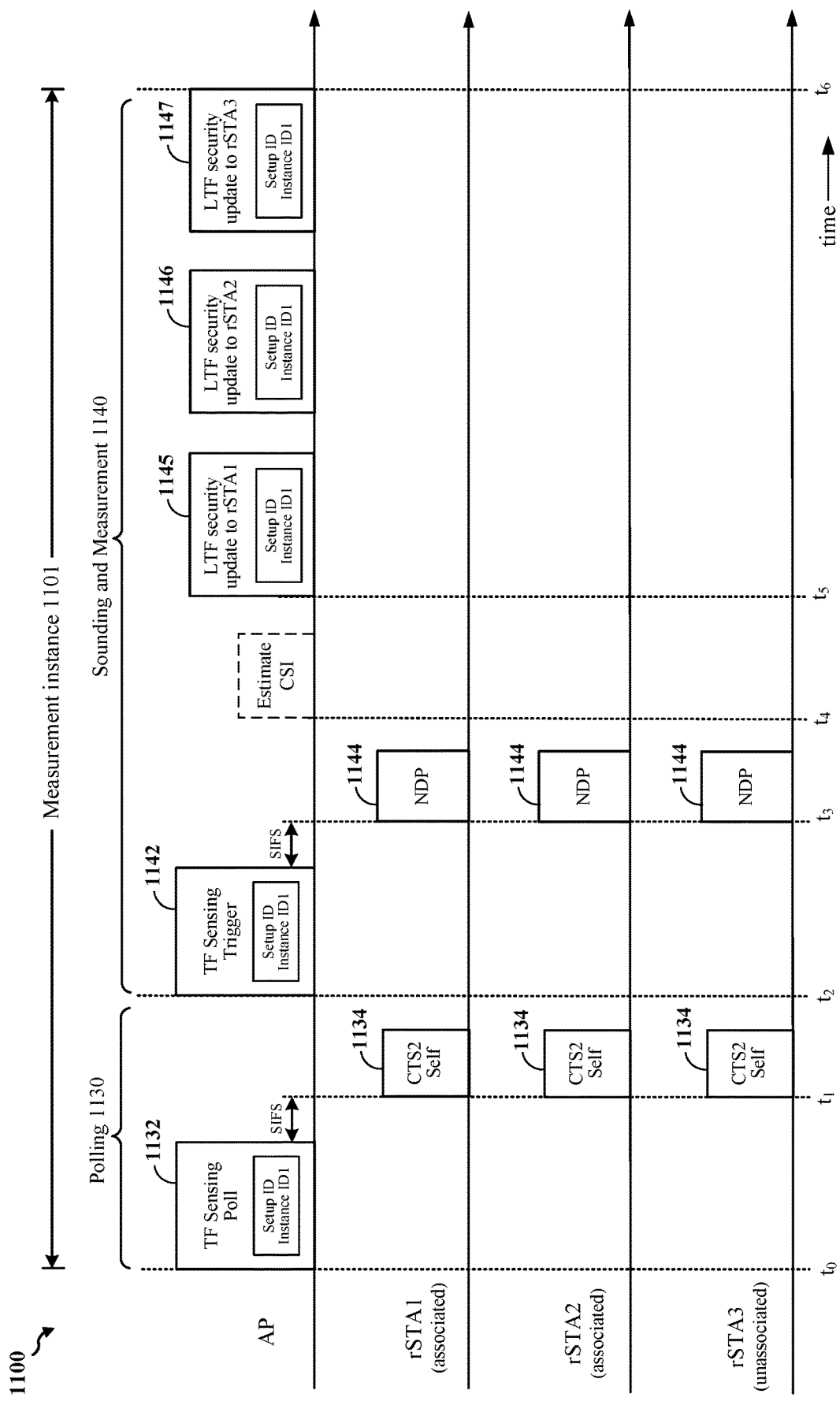
FIG. 11 shows a timing diagram illustrating an example sensing operation according to some other implementations.

FIG. 11 shows a timing diagram illustrating an example measurement exchange 1100 according to some other implementations. The communications shown in the example of FIG. 11 are exchanged between the AP and the responder devices rSTA1-rSTA3 described with reference to FIGS. 9A and 9B. The measurement exchange 1100 is shown to include one measurement instance 1101 including a polling phase 1130 and a sounding and measurement phase 1040 (the negotiation and measurement setup associated with the measurement instance 1101 of the measurement exchange 1100 is not shown in FIG. 11 for simplicity). In some instances, the polling phase 1130 may be one implementation of the polling phase 830 of FIG. 8. In some other instances, polling phase 1130 may be one implementation of the polling phase 1030 of FIGS. 9A and 9B. As discussed, the AP may identify the responder devices rSTA1-rSTA3 using their MAC addresses and their respective AIDs or UIDs. Communication sessions between the AP and each of the associated responder devices rSTA1-rSTA2 may be identified by the respective responder device's AID and the AP's default AID=0. Communication sessions between the AP and the unassociated responder device rSTA3 may be identified by rSTA3's UID and the AP's default AID=0.

At time to, the polling phase 1130 begins with the AP transmitting a TF Sensing Poll frame 1132 over the wireless channel to the responder devices rSTA1-rSTA3. The TF Sensing Poll frame 1132 may identify one or more of the responder devices rSTA1-rSTA3 for channel sounding. In some instances, the TF Sensing Poll frame 1132 may identify the responder devices rSTA1-rSTA3 by their respective AIDs or UIDs. The TA field of the TF Sensing Poll frame 1132 may be configured to verify the AID or UID of each identified rSTA, and the RA field of the TF Sensing Poll frame 1132 may be set to a broadcast address. In some aspects, a control field of the TF Sensing Poll frame 1132 may indicate that the TF Sensing Poll frame 1132 is of the Sensing type. In some implementations, the Measurement Instance ID of the corresponding measurement instance 1101 and the Measurement Setup ID identifying the sets of sensing parameters may be carried in a Dialog Token field of the TF Sensing Poll frame 1132. In some other implementations, another suitable poll or trigger frame may be used to poll the responder devices rSTA1-rSTA3.

The responder devices rSTA1-rSTA3 receive the TF Sensing Poll frame 1132 transmitted by the AP, and respond by transmitting respective CTS2Self frames 1134 over the wireless channel to the AP at time $t_1$. In some instances, the responder devices rSTA1-rSTA3 transmit the CTS2Self frames 1134 to the AP within a SIFS duration after receiving the TF Sensing Poll frame 1132. The AP may use reception of the CTS2Self frames 1134 to determine which of the identified responder devices rSTA1-rSTA3 are available for channel sounding.

At time $t_2$, the sounding and measurement 1140 begins with the AP transmitting a TF Sensing Trigger frame 1142 over the wireless channel to the responder devices rSTA1-rSTA3. The TF Sensing Trigger frame 1142 may identify one or more of the responder devices rSTA1-rSTA3 for channel sounding. In some instances, the TF Sensing Trigger frame 1142 may identify the responder devices rSTA1-rSTA3 by their respective AIDs or UIDs. The TA field of the TF Sensing Trigger frame 1142 may be configured to verify the AID or UID of each identified rSTA, and the RA field of the TF Sensing Trigger frame 1142 may be set to a broadcast address. In some aspects, a control field of the TF Sensing Trigger frame 1142 may indicate that the TF Sensing Trigger frame 1142 is of the Sensing type. In some implementations, the Measurement Instance ID of the corresponding measurement instance 1101 and the Measurement Setup ID identifying the sets of sensing parameters may be carried in a Dialog Token field of the TF Sensing Trigger frame 1142. In some other implementations, another suitable poll or trigger frame may be used to poll the responder devices rSTA1-rSTA3.

The responder devices rSTA1-rSTA3 receive the TF Sensing Trigger frame 1142 transmitted by the AP, and respond by transmitting NDPs 1144 over the wireless channel to the AP at time $t_3$. In some instances, the responder devices rSTA1-rSTA3 transmit the NDPs 1144 to the AP within a SIFS duration after receiving the TF Sensing Trigger frame 1142. The NDPs 1144 may carry one or more sounding sequences configured for estimating channel conditions or determining CSI of the wireless channel. In some instances, the NDPs 1144 may include a plurality of LTFs configured for channel estimation.

The AP receives the NDPs 1144, and estimates channel conditions or determines the CSI of the wireless channel at or around time $t_4$.

In some implementations, the AP may begin transmitting LTF security updates to the responder devices rSTA1-rSTA3 at time $t_5$. Specifically, the AP may transmit a first LTF security update frame 1145 to the first responder device rSTA1, followed by the transmission of a second LTF security update frame 1146 to the second responder device rSTA2, followed by the transmission of a third LTF security update frame 1147 to the third responder device rSTA3. In some instances, each of the LTF security update frames 1145-1147 may include the Measurement Instance ID of the corresponding measurement instance 1101 and the Measurement Setup ID assigned to the set of parameters. The Measurement Instance ID and the Measurement Setup ID may be carried in a Dialogue Token field of each of the LTF security update frames 1145-1147.

Figure 12:
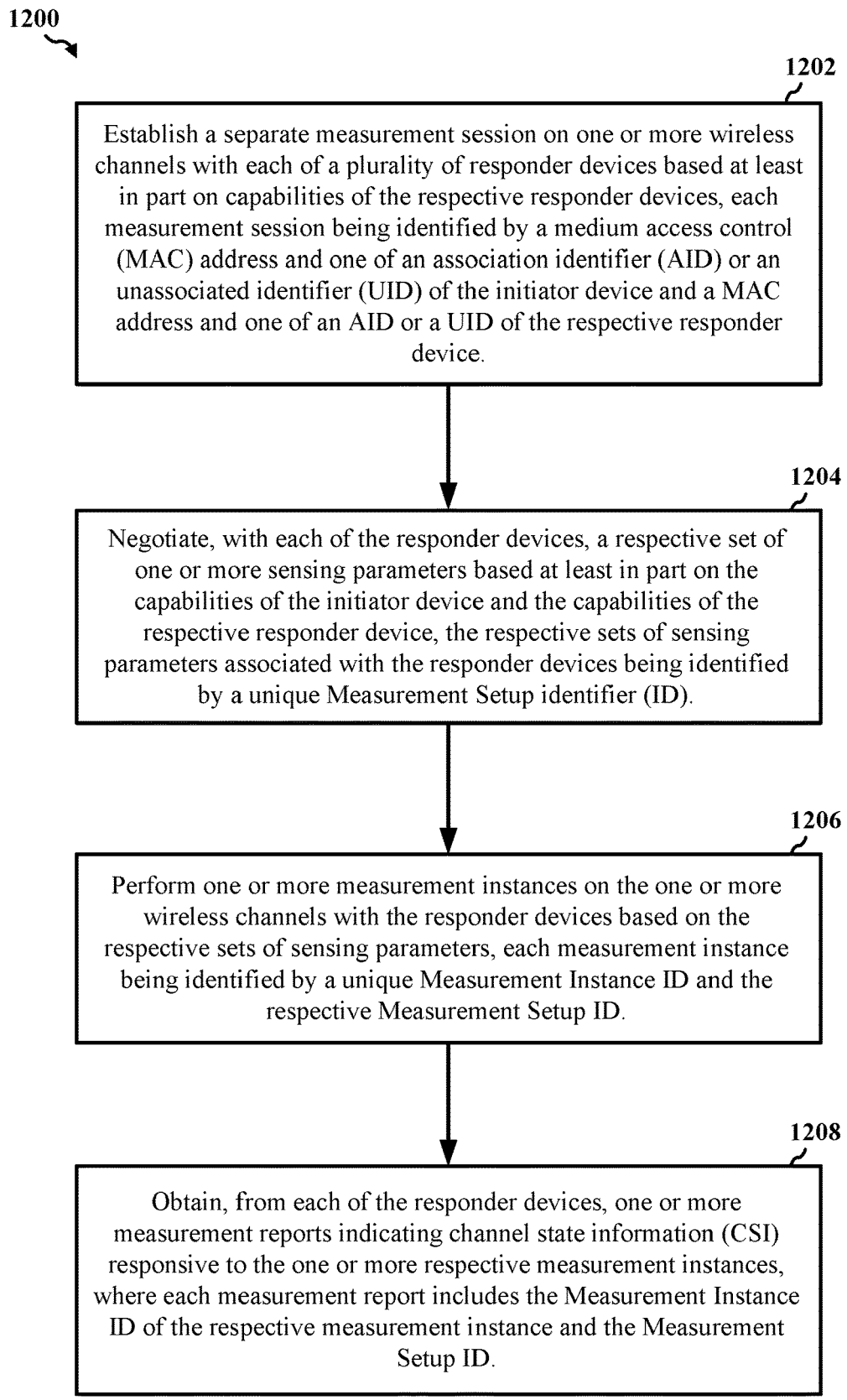
FIGS. 12-20 show flowcharts illustrating example operations for wireless communications that support wireless sensing according to some implementations.

FIG. 12 shows a flowchart illustrating an example operation 1200 for wireless communication that supports wireless sensing. The operation 1200 may be performed by or between an initiator device and one or more responder devices. In some implementations, the initiator device may be an AP such as one of the APs 102 or 602 described with reference to FIGS. 1 and 6A, respectively, and the responder devices may be STAs such as the STAs 104 or 604 described with reference to FIGS. 1 and 6B, respectively.

At block 1202, the initiator device establishes a separate measurement session on one or more wireless channels with each of a plurality of responder devices based at least in part on capabilities of the respective responder devices, each measurement session being identified by a medium access control (MAC) address and one of an association identifier (AID) or an unassociated identifier (UID) of the initiator device and a MAC address and one of an AID or a UID of the respective responder device. At block 1204, the initiator device negotiates, with each of the responder devices, a respective set of one or more sensing parameters based at least in part on the capabilities of the initiator device and the capabilities of the respective responder device, the respective sets of sensing parameters associated with the responder devices being identified by a unique Measurement Setup identifier (ID). In some instances, the sets of sensing parameters are identified by a unique Measurement Setup identifier (ID). At block 1206, the initiator device performs one or more measurement instances on the one or more wireless channels with the responder devices based on the respective sets of sensing parameters, each measurement instance being identified by a unique Measurement Instance ID and the respective Measurement Setup ID. At block 1208, the initiator device obtains, from each of the responder devices, one or more measurement reports indicating channel state information (CSI) based on the one or more respective measurement instances, each measurement report including the Measurement Instance ID of the respective measurement instance and the respective Measurement Setup ID.

In some implementations, the respective set of sensing parameters indicates one or more of a transmission bandwidth of sounding sequences associated with a respective measurement instance, a duration of the measurement instances, the number of measurement instances associated with the measurement setup, or roles assigned to the responder devices. In some instances, the measurement instances may also include, or may be associated with, one or more transmit parameters to be used for transmitting sounding sequences over the one or more wireless channels. The transmit parameters may include (but are not limited to) an antenna configuration of a transmitting device that transmits the sounding sequences, a transmit power level used by the transmitting device to transmit the sounding sequences, a number of spatial streams used to transmit the sounding sequences, or cyclic shift delay (CSD) values associated with transmitting the sounding sequences.

In some implementations, the Measurement Setup ID may indicate the sets of sensing parameters, the measurement report type and format, the roles assigned to the responder devices for the measurement instances, and a transmission schedule for the sounding sequences and the measurement reports. In some instances, the responder devices assigned to the transmitting device role may be configured to transmit one or more sounding sequences over the one or more wireless channels, and the responder devices assigned to the receiving device role may be configured to generate measurement reports indicating channel state information (CSI) responsive to the sounding sequences transmitted over the wireless channel. The initiator device may receive measurement reports from at least some of the responder devices assigned to the receiving device role.

In some implementations, the Measurement Instance ID may identify one or more of the poll frames, trigger frames, sounding announcements, sounding frames, renewals of long training field (LTF) keys, or measurement reports of an associated measurement instance.

Figure 13:
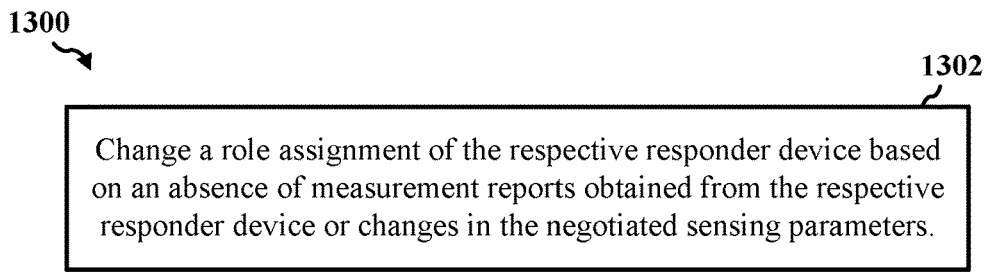

FIG. 13 shows a flowchart illustrating another example operation 1300 for wireless communication that supports wireless sensing. The operation 1300 may be performed by or between an initiator device and one or more responder devices. In some implementations, the initiator device may be an AP such as one of the APs 102 or 602 described with reference to FIGS. 1 and 6A, respectively, and the responder devices may be STAs such as the STAs 104 or 604 described with reference to FIGS. 1 and 6B, respectively. In some implementations, the operation 1300 may be performed at any suitable time after establishing the measurement session in block 1202 of FIG. 12. For example, at block 1302, the initiator device changes a role assignment of a respective responder device based on an absence of measurement reports obtained from the respective responder device or changes in the sensing parameters.

Figure 14:
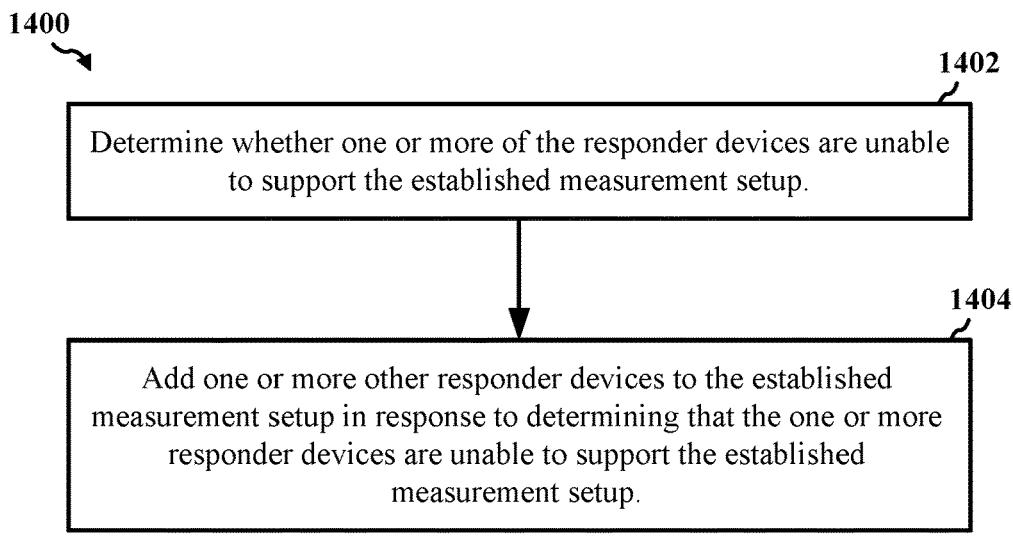

FIG. 14 shows a flowchart illustrating an example operation 1400 for wireless communication that supports wireless sensing. The operation 1400 may be performed by or between an initiator device and one or more responder devices. In some implementations, the initiator device may be an AP such as one of the APs 102 or 602 described with reference to FIGS. 1 and 6A, respectively, and the responder devices may be STAs such as the STAs 104 or 604 described with reference to FIGS. 1 and 6B, respectively. In some implementations, the operation 1400 may be performed at any suitable time after establishing the measurement session in block 1202 of FIG. 12. For example, at block 1402, the initiator device determines whether one or more of the responder devices are unable to support the established measurement setup. At block 1404, the initiator device adds one or more other responder devices to the established measurement setup in response to determining that the one or more responder devices are unable to support the established measurement setup. In this way, the initiator device can replace one or more responder devices that may no longer be able to support one or more parameters or requirements of the measurement setup.

Figure 15:
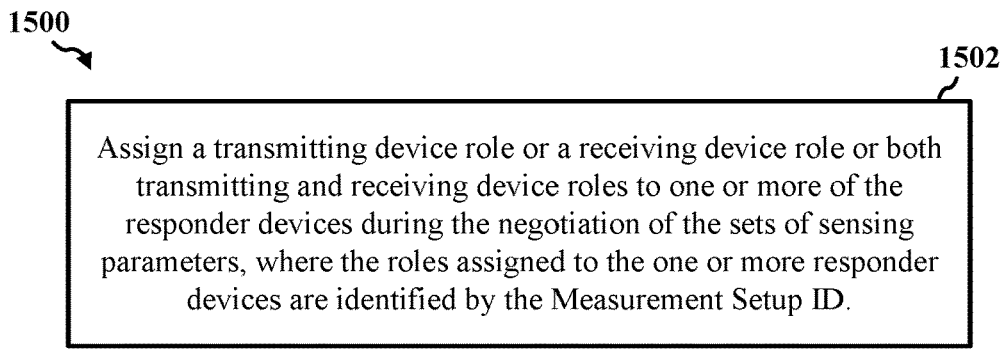

FIG. 15 shows a flowchart illustrating another example operation 1500 for wireless communication that supports wireless sensing. The operation 1500 may be performed by or between an initiator device and one or more responder devices. In some implementations, the initiator device may be an AP such as one of the APs 102 or 602 described with reference to FIGS. 1 and 6A, respectively, and the responder devices may be STAs such as the STAs 104 or 604 described with reference to FIGS. 1 and 6B, respectively. In some implementations, the operation 1500 may be performed at any suitable time after establishing the measurement session in block 1202 of FIG. 12. For example, at block 1502, the initiator device assigns a transmitting device role or a receiving device role or both transmitting and receiving device roles to one or more of the responder devices during the negotiation of the sensing parameters. In some instances, the roles assigned to the one or more responder devices may be identified by the Measurement Setup ID.

Figure 16:
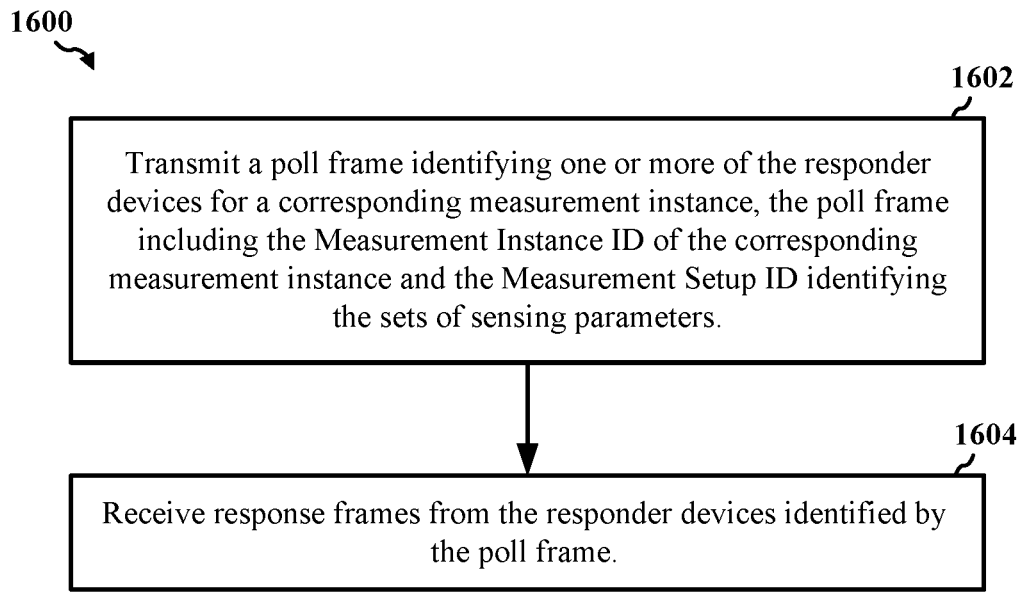

FIG. 16 shows a flowchart illustrating another example operation 1600 for wireless communication that supports wireless sensing. The operation 1600 may be performed by or between an initiator device and one or more responder devices. In some implementations, the initiator device may be an AP such as one of the APs 102 or 602 described with reference to FIGS. 1 and 6A, respectively, and the responder devices may be STAs such as the STAs 104 or 604 described with reference to FIGS. 1 and 6B, respectively.

In some implementations, the operation 1600 may be one example of obtaining the measurement reports in block 1208 of FIG. 12. For example, at block 1602, the initiator device transmits a poll frame identifying one or more of the responder devices for a corresponding measurement instance, the poll frame including the Measurement Instance ID of the corresponding measurement instance and the Measurement Setup ID identifying the sets of sensing parameters. At block 1604, the initiator device receives response frames from the responder devices identified by the poll frame. In some instances, the Measurement Setup ID and the Measurement Instance ID may be carried in the Dialogue Token field of the poll frame. In some other instances, the poll frame may include a control field indicating that the poll frame is a Trigger Frame (TF) Sensing Poll frame.

Figure 17:
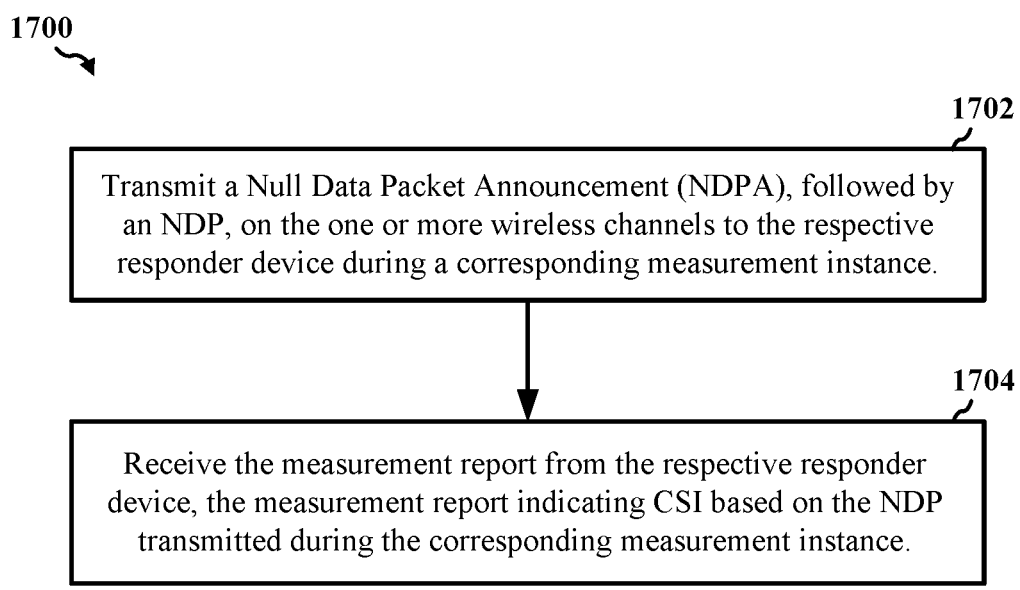

FIG. 17 shows a flowchart illustrating another example operation 1700 for wireless communication that supports wireless sensing. The operation 1700 may be performed by or between an initiator device and one or more responder devices. In some implementations, the initiator device may be an AP such as one of the APs 102 or 602 described with reference to FIGS. 1 and 6A, respectively, and the responder devices may be STAs such as the STAs 104 or 604 described with reference to FIGS. 1 and 6B, respectively.

In some implementations, the operation 1700 may be another example of obtaining the measurement reports in block 1206 and 1208 of FIG. 12. In some instances, the operation 1700 may be performed after the operation 1500 of FIG. 15. For example, at block 1702, the initiator device transmits a Null Data Packet (NDP) Announcement, followed by an NDP, on the one or more wireless channels to the identified responder devices during a respective measurement exchange. At block 1704, the initiator device receives the measurement reports from the identified responder devices during the respective measurement exchange. In some aspects, the measurement reports may indicate CSI based on to the NDP. In some instances, the NDP Announcement includes a Dialogue Token field carrying the Measurement Instance ID of the corresponding measurement instance and the Measurement Setup ID identifying the sets of parameters. In some other instances, each of the measurement reports may include a Dialogue Token field that carries the Measurement Instance ID of the corresponding measurement instance and the Measurement Setup ID identifying the sets of parameters. In some aspects, the NDP Announcement includes a control field indicating that the NDP Announcement is a Sensing NDP Announcement frame.

Figure 18:
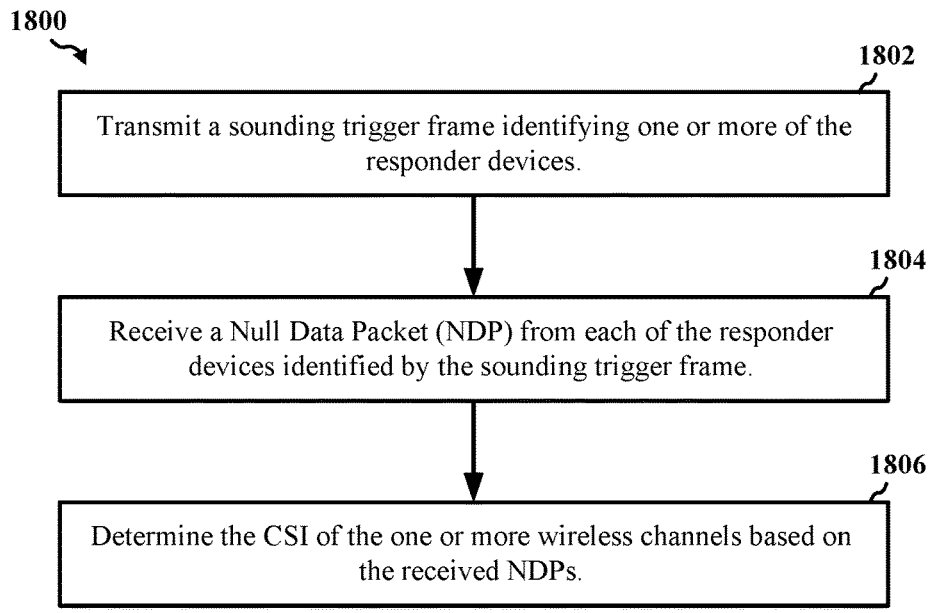

FIG. 18 shows a flowchart illustrating another example operation 1800 for wireless communication that supports wireless sensing. The operation 1800 may be performed by or between an initiator device and one or more responder devices. In some implementations, the initiator device may be an AP such as one of the APs 102 or 602 described with reference to FIGS. 1 and 6A, respectively, and the responder devices may be STAs such as the STAs 104 or 604 described with reference to FIGS. 1 and 6B, respectively.

In some implementations, the operation 1800 may be another example of obtaining the measurement reports in block 1206 of FIG. 12. For example, at block 1802, the initiator device transmits a sounding trigger frame identifying one or more of the responder devices. At block 1804, the initiator device receives an NDP from each of the responder devices identified by the sounding trigger frame. At block 1806, the initiator device determines the CSI of the one or more wireless channels based on the received NDPs.

In some implementations, the sounding trigger frame includes a Dialogue Token field carrying the Measurement Instance ID of the corresponding measurement instance and the Measurement Setup ID identifying the sets of parameters. In some instances, the poll frame, the sounding trigger frame, and the NDP Announcement identify a respective responder device based on an association identifier (AID) or an unassociated identifier (UID) of the respective responder device. In some aspects, one or more of the poll frame, the sounding trigger frame, or the NDP Announcement includes a transmitter address (TA) field configured to verify the respective AIDs or UIDs of the one or more responder devices. In some other instances, one or more of the poll frame, the sounding trigger frame, or the NDP Announcement includes a receiver address (RA) field set to a broadcast address.

Figure 19:
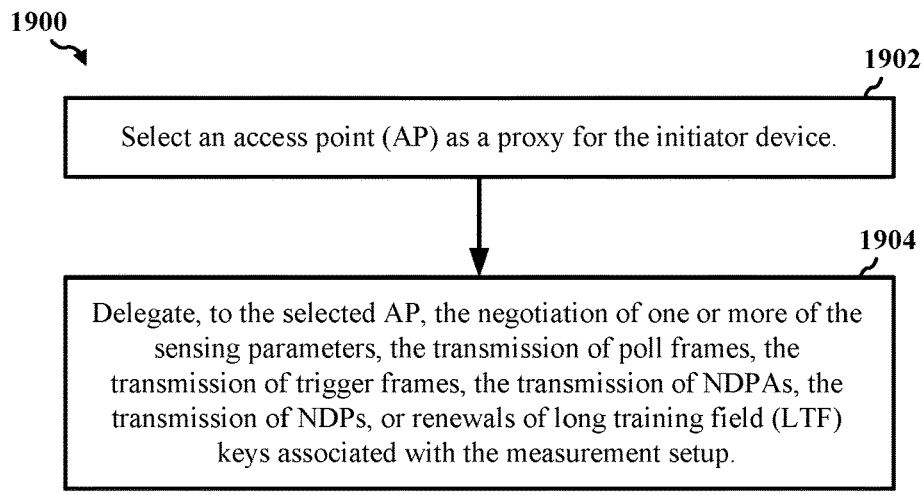

FIG. 19 shows a flowchart illustrating an example operation 1900 for wireless communication that supports wireless sensing. The operation 1900 may be performed by or between an initiator device and one or more responder devices. In some implementations, the initiator device may be a STA such as one of the STAs 104 or 604 described with reference to FIGS. 1 and 6B, respectively, and the responder devices may be STAs such as one of the STAs 104 or 604 described with reference to FIGS. 1 and 6B, respectively. In some implementations, the operation 1900 may be performed at any suitable time after establishing the measurement session in block 1202 of FIG. 12. For example, at block 1902, the initiator device selects an access point (AP) as a proxy for the initiator device. At block 1904, the initiator device delegates transmission of poll frames, trigger frames, NDP Announcements, NDPs, and renewals of LTF keys associated with measurement setup to the selected AP. In this way, the initiator device may offload the transmission of various frames associated with the negotiation of the sensing parameters and the measurement instances to the AP, thereby allowing the initiator device to reduce power consumption or to perform other tasks during the measurement exchange.

Figure 20:
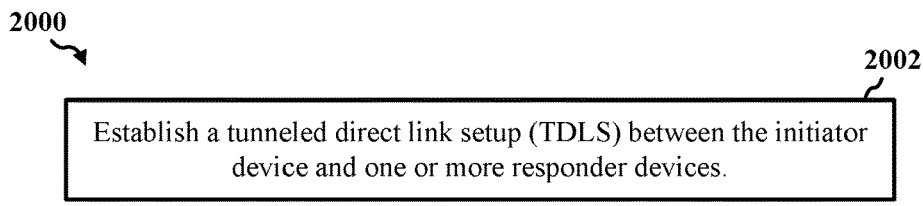

FIG. 20 shows a flowchart illustrating an example operation 2000 for wireless communication that supports wireless sensing. The operation 2000 may be performed by or between an initiator device and one or more responder devices. In some implementations, the initiator device may be a STA such as one of the STAs 104 or 604 described with reference to FIGS. 1 and 6B, respectively, and the responder devices may be STAs such as one of the STAs 104 or 604 described with reference to FIGS. 1 and 6B, respectively. In some implementations, the operation 2000 may be performed at any suitable time after establishing the measurement session in block 1202 of FIG. 12. For example, at block 2002, the initiator device establishes a tunneled direct link setup (TDLS) between the initiator device and two or more responder devices. In this way, the initiator device may perform measurement exchanges with each of the two or more responder devices using direct links (such as P2P connections) between one another.

Figure 21:
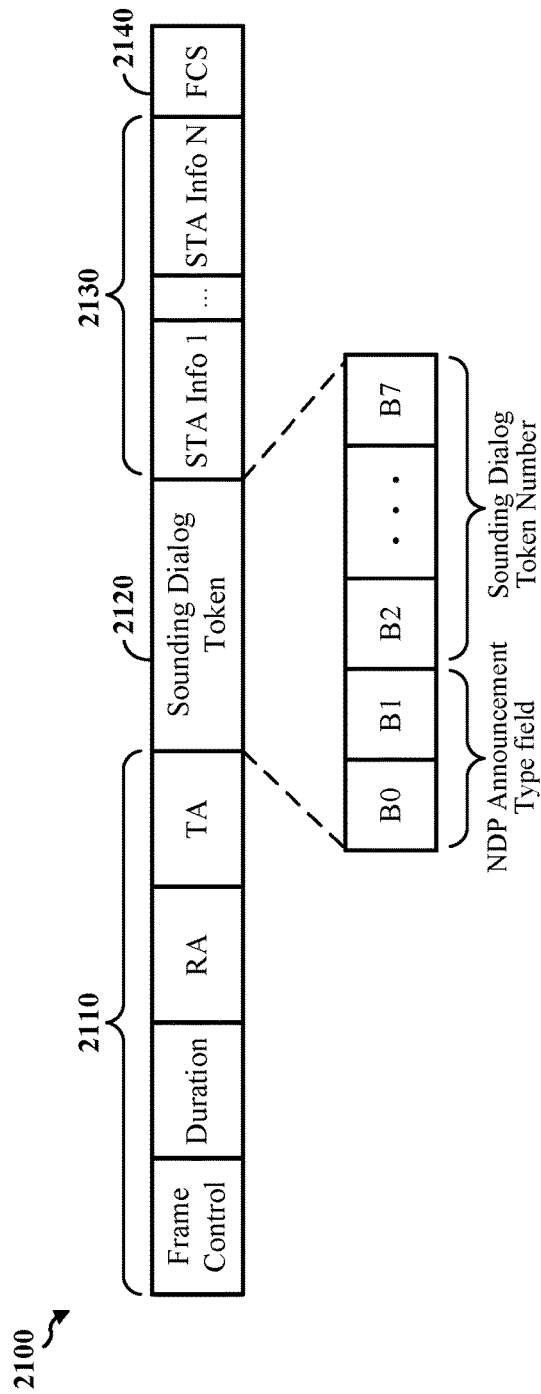
FIG. 21 shows an example null data packet (NDP) Announcement frame usable for channel sounding according to some implementations.

FIG. 21 shows an example NDP Announcement frame 2100 usable for sensing a wireless channel according to some implementations. In some aspects, the NDP Announcement frame 2100 may signal or announce the transmission of an NDP to be used by receiving devices to estimate channel conditions or determine the CSI of a wireless channel based on the sounding sequences carried by the NDP. The NDP Announcement frame 2100 includes a MAC header 2110, a sounding dialog token field 2120, a number (n) of STA Info fields 2130, and a frame check sequence (FCS) field 2140. The MAC header 2110 includes a frame control field, a duration field, a receiver address (RA) field, and a transmitter address (TA) field. In some implementations, the frame control field may carry information indicating a new control sub-type.

The sounding dialog token field 2120 carries information indicating a sounding dialog token number associated with the NDP Announcement frame 2100. In some implementations, the sounding dialog token field 2120 is 1 octet (8 bits) in length, and may include a 2-bit NDP Announcement Type subfield and a 6-bit sounding dialog token number subfield. In some instances, the NDP Announcement Type subfield may be set by a transmitting device to a new value (such as "11") to indicate that the NDP Announcement frame 2100 is a Sensing NDP Announcement frame.

The sounding dialog token number subfield may carry a sounding dialog token number that can be used to identify the NDP Announcement frame 2100 and the NDP that follows the NDP Announcement frame 2100. In some implementations, when the NDP Announcement Type subfield is set to a value indicating a Sensing subtype, all 6 bits of the sounding dialog token number subfield are used to carry the Measurement Setup ID and the Measurement Instance ID.

Each of the STA Info fields 2130 carries bandwidth information indicating a bandwidth associated with sounding feedback requested by the NDP Announcement frame 2100. Such bandwidth information may include, among other examples, a range of resource units (RUs) on which the channel estimation is to be performed or one or more punctured subchannels on which the channel estimation is not to be performed. The FCS field 2140 may store a frame check sequence for error detection.

Figure 22:
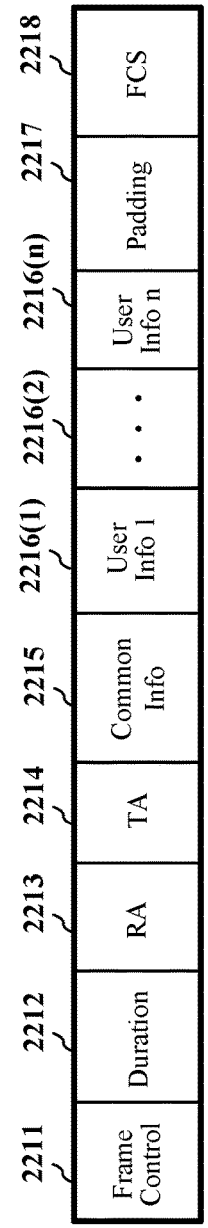
FIG. 22 shows an example trigger frame usable for wireless communications according to some implementations.

FIG. 22 shows an example trigger frame 2200 usable for polling or triggering one or more wireless communication devices, according to some implementations. In some instances, the trigger frame 2200 may be used as one of the TF Sensing Poll frames 1032 described with reference to FIGS. 10A, 10B, and 11. In some other instances, the trigger frame 2200 may be used as one of the TF Sensing Trigger frames 1052 or 1142 described with reference to FIGS. 10A, 10B, and 11.

The trigger frame 2200 is shown to include a frame control field 2201, a duration field 2202, a receiver address (RA) field 2203, a transmitter address (TA) field 2204, a Common Info field 2205, a number of User Info fields 2206(1)-2206(n), an optional Padding field 2207, and a frame check sequence (FCS) field 2208. The frame control field 2201 contains a Type field and a Sub-type field (not shown for simplicity). In some implementations, the Type and Sub-type fields may store a new value (such as the binary representation of the decimal number "9") to indicate that the trigger frame 2200 is a control frame of the Sensing type. In some implementations, when the trigger frame 2200 is of the variant type "Sensing," all 6 bits of the sounding dialog token number subfield are used to carry the Measurement Setup ID and the Measurement Instance ID in the trigger frame 2200.

The duration field 2202 may store information indicating a duration or length of the trigger frame 2200. The RA field 2203 may store the address of a receiving device, such as one of the responder devices of FIGS. 10A, 10B, and 11. The TA field 2204 may store the address of a transmitting device, such as the initiator device of FIGS. 10A, 10B, and 11. The Common Info field 2205 may store information common to the receiving devices. Each of the User Info fields 2206(1)-2206(n) may store information for a corresponding receiving device such as, for example, the AID or UID of the corresponding receiving device. The Padding field 2207 may extend a length of the trigger frame 2200, for example, to give a receiving device additional time to generate a response. The FCS field 2208 may store a frame check sequence for error detection.

Figure 23:
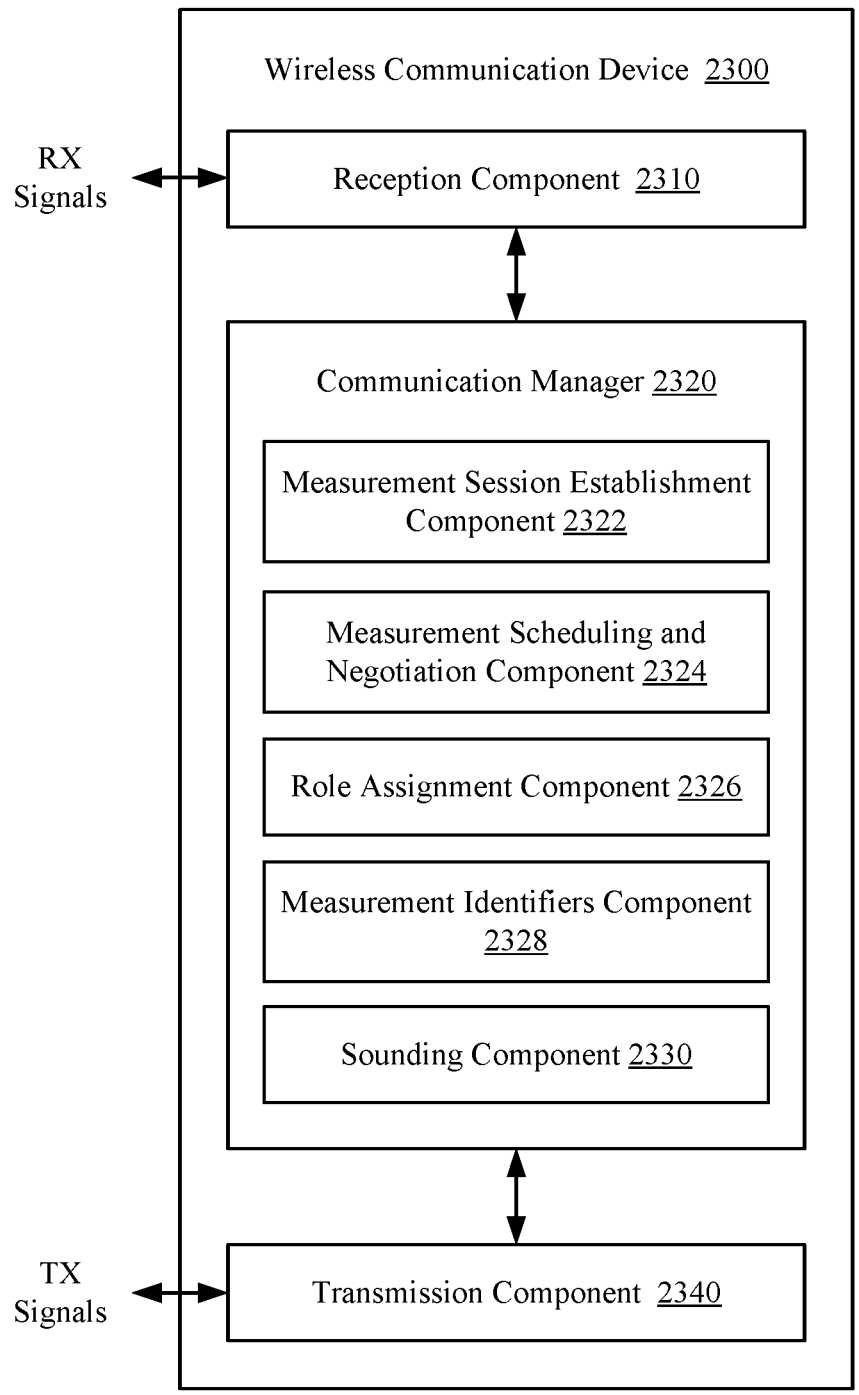
FIG. 23 shows a block diagram of an example wireless communication device according to some implementations.

FIG. 23 shows a block diagram of an example wireless communication device 2300 according to some implementations. In some implementations, the wireless communication device 2300 may be configured as an access point such as the AP 802 of FIG. 8. In some other implementations, the wireless communication device 2300 may be configured as an initiator device such as the AP of FIGS. 9A, 9B, 10A, 10B, or 11. The wireless communication device 2300 can be an example implementation of the wireless communication device 500 described above with reference to FIG. 5. For example, the wireless communication device 2300 can be a chip, SoC, chipset, package or device that includes at least one processor and at least one modem (for example, a Wi-Fi (IEEE 802.11) modem or a cellular modem). In some implementations, the wireless communication device 2300 can be a device for use in an AP, such as one of the APs 102 and 602 described with reference to FIGS. 1 and 6A, respectively. In some other implementations, the wireless communication device 2300 can be an AP that includes such a chip, SoC, chipset, package, or device as well as at least one antenna (such as the antennas 620).

The wireless communication device 2300 includes a reception component 2310, a communication manager 2320, and a transmission component 2340. The communication manager 2320 further includes a measurement session establishment component 2322, a measurement scheduling and negotiation component 2324, a role assignment component 2326, a Measurement Identifiers component 2328, and a sounding component 2330. Portions of one or more of the components 2322, 2324, 2326, 2328, and 2330 may be implemented at least in part in hardware or firmware. In some implementations, at least some of the components 2322, 2324, 2326, 2328, and 2330 are implemented at least in part as software stored in a memory (such as the memory 508). For example, portions of one or more of the components 2322, 2324, 2326, 2328, and 2330 can be implemented as non-transitory instructions (or "code") executable by a processor (such as the processor 506) to perform the functions or operations of the respective component.

The reception component 2310 is configured to receive RX signals, over a wireless channel, from one or more other wireless communication devices. For example, in some aspects, the reception component 2310 may be configured to receive measurement reports from one or more responder devices during measurement exchanges described herein. The communication manager 2320 is configured to control or manage communications with one or more other wireless communication devices. In some implementations, the measurement session establishment component 2322 may establish a measurement session on a wireless channel with one or more responder devices based at least in part on capabilities of the responder devices. The measurement scheduling and negotiation component 2324 may determine, obtain, or negotiate sensing parameters and sounding schedules with a plurality of responder devices. The role assignment component 2326 may assign roles (such as a transmitting device role or a receiving device role or both a transmitting device and receiving device role) to one or more of the responder devices. The Measurement Identifiers component 2328 may assign a Measurement Setup ID to identify the sets of sensing parameters, and may assign a Measurement Instance ID to each of the measurement instances associated with the measurement exchange. The sounding component 2330 may transmit one or more sounding sequences (such as LTFs carried in an NDP) configured for channel estimation to the responder devices. The transmission component 2340 may transmit TX signals over the wireless channel to one or more wireless communication devices. For example, in some aspects, the transmission component 2340 may be configured to transmit poll frames, NDP Announcements, NDPs, and trigger frames to the one or more responder devices.

Figure 24:
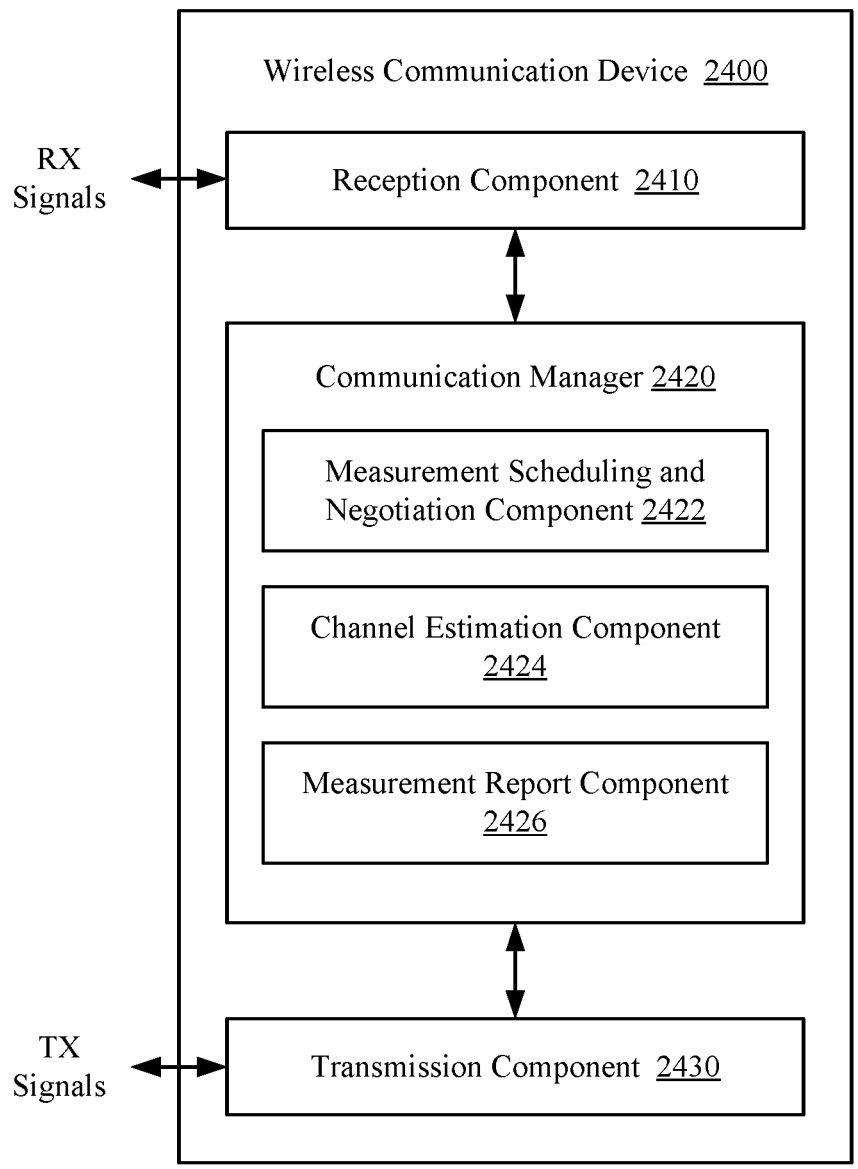
FIG. 24 shows a block diagram of an example wireless communication device according to some other implementations.

FIG. 24 shows a block diagram of an example wireless communication device 2400 according to some other implementations. In some implementations, the wireless communication device 2400 may be configured as a wireless station such as one of the STAs 804 of FIG. 8. In some other implementations, the wireless communication device 2400 may be configured as a responder device such as the responder devices rSTA1-rSTA3 of FIGS. 9A, 9B, 10A, 10B, or 11. The wireless communication device 2400 can be an example implementation of the wireless communication device 500 described above with reference to FIG. 5. For example, the wireless communication device 2400 can be a chip, SoC, chipset, package or device that includes at least one processor and at least one modem (for example, a Wi-Fi (IEEE 802.11) modem or a cellular modem). In some implementations, the wireless communication device 2400 can be a device for use in an STA, such as one of the STAs 104 and 604 described with reference to FIGS. 1 and 6A, respectively. In some other implementations, the wireless communication device 2400 can be a STA that includes such a chip, SoC, chipset, package, or device as well as at least one antenna (such as the antennas 625).

The wireless communication device 2400 includes a reception component 2410, a communication manager 2420, and a transmission component 2430. The communication manager 2420 further includes a measurement scheduling and negotiation component 2422, a channel estimation component 2424, and a Measurement Report component 2426. Portions of one or more of the components 2422, 2424, and 2426 may be implemented at least in part in hardware or firmware. In some implementations, at least some of the components 2422, 2424, and 2426 are implemented at least in part as software stored in a memory (such as the memory 508). For example, portions of one or more of the components 2422, 2424, and 2426 can be implemented as non-transitory instructions (or "code") executable by a processor (such as the processor 506) to perform the functions or operations of the respective component.

The reception component 2410 is configured to receive RX signals, over a wireless channel, from one or more other wireless communication devices. For example, in some aspects, the reception component 2410 may be configured to receive sounding sequences (such as LTFs carried in an NDP) transmitted over the wireless channel by an initiator device. The communication manager 2420 is configured to control or manage communications with the one or more other wireless communication devices. In some implementations, the measurement scheduling and negotiation component 2422 may determine, obtain, or negotiate parameters and sounding schedules with the initiator device. The channel estimation component 2424 may estimate channel conditions or determine channel state information (CSI) responsive to sounding sequences transmitted over the wireless channel. The Measurement Report component 2426 may generate one or more measurement reports indicating the CSI determined responsive to one or more corresponding sounding sequence transmissions over the wireless channel. The transmission component 2430 may transmit TX signals over the wireless channel to one or more other wireless communication devices. For example, in some aspects, the transmission component 2430 may be configured to transmit the measurement reports to the initiator device.

Implementation examples are described in the following numbered clauses:

1. A method for wireless communication performed by an initiator device, including:
    establishing a separate measurement session on one or more wireless channels with each of a plurality of responder devices based at least in part on capabilities of the respective responder devices, each measurement session being identified by a medium access control (MAC) address and one of an association identifier (AID) or an unassociated identifier (UID) of the initiator device and a MAC address and one of an AID or a UID of the respective responder device;
    negotiating, with each of the responder devices, a respective set of one or more sensing parameters based at least in part on the capabilities of the initiator device and the capabilities of the respective responder device, the respective sets of sensing parameters associated with the responder devices being identified by a unique Measurement Setup identifier (ID);
    performing one or more measurement instances on the one or more wireless channels with the responder devices based on the respective sets of sensing parameters, each measurement instance being identified by a unique Measurement Instance ID and the respective Measurement Setup ID; and
    obtaining, from each of the responder devices, one or more measurement reports indicating channel state information (CSI) based on the one or more respective measurement instances, each measurement report including the Measurement Instance ID of the respective measurement instance and the respective Measurement Setup ID.

2. The method of clause 1, where the respective set of sensing parameters indicates a transmission bandwidth of sounding sequences associated with a respective measurement instance, a duration of the measurement instances, the number of measurement instances associated with the measurement setup, roles assigned to the responder devices, or any combination thereof.

3 The method of clause 1, where each measurement report further includes a long training field (LTF) security update for the respective responder device.

4. The method of any one or more of clauses 1-3, further including:
    assigning a transmitting device role or a receiving device role or both transmitting and receiving device roles to one or more of the responder devices during the negotiation of the sets of sensing parameters, wherein the roles assigned to the one or more responder devices are identified by the Measurement Setup ID.

5. The method of clause 4, where the measurement reports are obtained from responder devices assigned to the receiving device role, and sounding sequences are solicited from responder devices assigned to the transmitting device role.

6. The method of any one or more of clauses 1-5, further including:
    changing a role assignment of the respective responder device based on an absence of measurement reports obtained from the respective responder device or changes in the sets of sensing parameters.

7. The method of claim 1, where the Measurement Setup ID indicates the sets of sensing parameters, roles assigned to one or more of the responder devices, a schedule for performing the measurement instances and obtaining the measurement reports, and a report type and format for the measurement reports.

8. The method of claim 1, further including:
    determining whether one or more of the responder devices are unable to support the established measurement setup; and
    adding one or more other responder devices to the established measurement setup in response to determining that the one or more responder devices are unable to support the established measurement setup.

9. The method of any one or more of clauses 1-8, where each Measurement Instance ID identifies poll frames, trigger frames, sounding announcements, renewals of long training field (LTF) keys, or measurement reports of an associated measurement instance.

10. The method of claim 9, where the renewals of LTF keys include the transmission of protected frames that carry the LTF keys or one or more parameters from which the LTF keys are derived.

11. The method of any one or more of clauses 1-10, where obtaining the measurement reports includes:
    transmitting a poll frame identifying one or more of the responder devices for a corresponding measurement instance, the poll frame including the Measurement Instance ID of the corresponding measurement instance and the Measurement Setup ID identifying the sets of sensing parameters; and
    receiving response frames from the responder devices identified by the poll frame.

12. The method of clause 11, where the Measurement Instance ID and the Measurement Setup ID are carried in a Dialogue Token field of the poll frame.

13. The method of any one or more of clauses 11-12, where the poll frame includes a control field indicating that the poll frame is a Trigger Frame (TF) Sensing Poll frame.

14. The method of clause 11, where obtaining the measurement reports further includes:
    transmitting a Null Data Packet (NDP) Announcement, followed by an NDP, on the one or more wireless channels to the responder devices during a corresponding measurement instance; and
    receiving the measurement report from the respective responder device, the measurement report indicating CSI based on the NDP transmitted during the corresponding measurement instance.

15. The method of clause 14, where the NDPA includes a Dialogue Token field carrying the Measurement Instance ID of the corresponding measurement instance and the Measurement Setup ID identifying the sets of sensing parameters.

16. The method of any one or more of clauses 14-15, where the NDPA includes a control field indicating that the NDPA is a Sensing NDP Announcement frame.

17. The method of clause 12, where obtaining the measurement reports further includes:
    transmitting a sounding trigger frame identifying one or more of the responder devices;

receiving a Null Data Packet (NDP) from each of the responder devices identified by the sounding trigger frame; and determining the CSI of the one or more wireless channels based on the received NDPs.

18. The method of clause 17, where the sounding trigger frame includes a Dialogue Token field carrying the Measurement Instance ID of the corresponding measurement instance and the Measurement Setup ID identifying the sets of sensing parameters.

19. The method of any one or more of clauses 17-18, where the sounding trigger frame includes a control field indicating that the sounding trigger frame is a Trigger Frame (TF) Sensing Sounding trigger frame.

20. The method of any one or more of clauses 17-19, where the poll frame, the sounding trigger frame, and the NDP Announcement identify a respective responder device based on an association identifier (AID) or an unassociated identifier (UID) of the respective responder device.

21. The method of clause 20, where the poll frame, the sounding trigger frame, and the NDPA identify the one or more responder devices based on the respective AIDs or UIDs of the one or more responder devices.

22. The method of any one or more of clauses 17-21, where one or more of the poll frame, the sounding trigger frame, or the NDPA includes a receiver address (RA) field set to a broadcast address.

23. The method of any one or more of clauses 1-22, where the initiator device is an access point (AP), and the method further includes configuring a tunneled direct link setup (TDLS) between two or more of the responder devices.

24. The method of any one or more of clauses 1-23, where a first group of the responder devices includes wireless stations (STAs) associated with the AP and identified by association identifiers (AIDs), and a second group of the responder devices includes unassociated STAs identified by user identifiers (UIDs) associated with a Pre-Association Security Negotiation (PASN).

25. The method of any one or more of clauses 1-24, where the initiator device is a wireless station (STA), and method further includes: establishing a tunneled direct link setup (TDLS) between the initiator device and two or more responder devices.

26. The method of any one or more of clauses 1-25, where the initiator device is a wireless station (STA), and method further includes: selecting an access point (AP) as a proxy for the initiator device; and delegating, to the selected AP, one or more of the negotiation of sensing parameters, the transmission of poll frames, the transmission of trigger frames, the transmission of Null Data Packet Announcements (NDPAs), the transmission of NDPs, or renewals of long training field (LTF) keys associated with the measurement setup.

27. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
establish a separate measurement session on one or more wireless channels with each of a plurality of responder devices based at least in part on capabilities of the respective responder devices, each measurement session being identified by a medium access control (MAC) address and one of an association identifier (AID) or an unassociated identifier (UID) of the initiator device and a MAC address and one of an AID or a UID of the respective responder device;

negotiate, with each of the responder devices, a respective set of one or more sensing parameters based at least in part on the capabilities of the initiator device and the capabilities of the respective responder device, the respective sets of sensing parameters associated with the responder devices being identified by a unique Measurement Setup identifier (ID);

perform one or more measurement instances on the one or more wireless channels with the responder devices based on the respective sets of sensing parameters, each measurement instance being identified by a unique Measurement Instance ID and the respective Measurement Setup ID; and obtain, from each of the responder devices, one or more measurement reports indicating channel state information (CSI) based on the one or more respective measurement instances, where each measurement report includes the Measurement Instance ID of the respective measurement instance and the Measurement Setup ID.

28. The wireless communication device of clause 27, where execution of the processor-readable code is further configured to:
assign a transmitting device role or a receiving device role to one or more of the responder devices during negotiation of the sensing parameters with each of the plurality of responder devices.

29. The wireless communication device of clause 28, where the Measurement Setup ID indicates the sets of sensing parameters, roles assigned to one or more of the responder devices, a schedule for performing the measurement instances and obtaining the measurement reports, and a report type and format for the measurement reports.

30. The wireless communication device of any one or more of clauses 27-29, where each Measurement Instance ID identifies poll frames, trigger frames, sounding announcements, renewals of long training field (LTF) keys, or measurement reports of an associated measurement instance.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

What is claimed is:

1. A method for wireless communication performed by an initiator device, comprising:
    negotiating, with a plurality of responder devices, respective sets of one or more sensing parameters based at least in part on capabilities of the initiator device and respective capabilities of the plurality of responder devices, the respective sets of one or more sensing parameters being identified by a respective unique first identifier (ID);
    performing one or more measurement instances on one or more wireless channels with the plurality of responder devices based on the respective sets of one or more sensing parameters, each measurement instance of the one or more measurement instances being identified by a respective unique second ID and the respective unique first ID; and
    obtaining, from each of the plurality of responder devices, one or more measurement reports indicating channel state information (CSI) based on the one or more measurement instances, each measurement report including the respective unique second ID of a respective measurement instance and the respective unique first ID.

2. The method of claim 1, further comprising:
    identifying a medium access control (MAC) address and one of an association identifier (AID) or an unassociated identifier (UID) of each of the plurality of responder devices, wherein the negotiating with the plurality of responder devices is based at least in part on the identifying the MAC address and the one of the AID or UID of each of the plurality of responder devices.

3. The method of claim 2, wherein the negotiating with each of the plurality of responder devices is based at least in part on a MAC address and one of an AID or UID of the initiator device.

4. The method of claim 1, wherein the respective unique first ID is a measurement setup ID, and wherein the respective unique second ID is a measurement instance ID.

5. The method of claim 1, wherein the respective sets of one or more sensing parameters indicate a respective transmission bandwidth of sounding sequences associated with a corresponding measurement instance, a respective duration of corresponding one or more measurement instances, a quantity of corresponding measurement instances, roles assigned to a respective responder device of the plurality of responder devices, or any combination thereof.

6. The method of claim 1, wherein each measurement report of the one or more measurement reports includes a long training field (LTF) security update for a respective responder device of the plurality of responder devices.

7. The method of claim 1, further comprising:
    assigning a transmitting device role, a receiving device role, or both transmitting and receiving device roles to one or more of the plurality of responder devices during the negotiating, wherein roles assigned to the one or more of the plurality of responder devices are identified by the respective unique first ID.

8. The method of claim 7, wherein the one or more measurement reports are obtained from a first set of responder devices assigned to the receiving device role, and wherein sounding sequences are solicited from a second set of responder devices assigned to the transmitting device role.

9. The method of claim 7, further comprising:
    changing a role assignment of one of the one or more of the plurality of responder devices based at least in part on an absence of measurement reports obtained from the one of the one or more of the plurality of responder devices or changes in the respective sets of one or more sensing parameters.

10. The method of claim 1, wherein the respective unique first ID indicates a respective set of one or more sensing parameters, roles assigned to a respective responder device, a schedule for performing respective one or more measurement instances and obtaining respective one or more measurement reports, a report type and format for the respective one or more measurement reports, or a combination thereof.

11. The method of claim 1, wherein each unique second ID identifies poll frames, trigger frames, sounding announcements, renewals of long training field (LTF) keys, or measurement reports of an associated measurement instance.

12. The method of claim 11, wherein the renewals of LTF keys include transmission of protected frames that carry the LTF keys or one or more parameters from which the LTF keys are derived.

13. The method of claim 1, wherein obtaining the one or more measurement reports comprises:
    transmitting a poll frame identifying one or more of the plurality of responder devices for a corresponding measurement instance, the poll frame including for each of the one or more of the plurality of responder devices, the respective unique second ID of the corresponding measurement instance and the respective unique first ID identifying a respective set of sensing parameters; and receiving response frames from the one or more of the plurality of responder devices.

14. The method of claim 13, wherein the respective unique first ID and the respective unique second ID for each of the one or more of the plurality of responder devices are carried in a Dialogue Token field of the poll frame.

15. The method of claim 13, wherein the poll frame includes a control field indicating that the poll frame is a Trigger Frame (TF) Sensing Poll frame.

16. The method of claim 13, wherein obtaining the one or more measurement reports further comprises:

transmitting a Null Data Packet (NDP) Announcement, followed by an NDP, on the one or more wireless channels to the plurality of responder devices during the corresponding measurement instance; and receiving the one or more measurement reports from the plurality of responder devices, the one or more measurement reports indicating the CSI based on the NDP transmitted during the corresponding measurement instance.

17. The method of claim 16, wherein the NDP Announcement includes a Dialogue Token field carrying the respective unique second ID of the corresponding measurement instance and the respective unique first ID identifying the respective set of sensing parameters.

18. The method of claim 16, wherein the NDP Announcement includes a control field indicating that the NDP Announcement is a Sensing NDP Announcement frame.

19. The method of claim 13, wherein obtaining the one or more measurement reports further comprises:

transmitting a sounding trigger frame identifying one or more of the plurality of responder devices;

receiving a Null Data Packet (NDP) from each of the one or more of the plurality of responder devices identified by the sounding trigger frame; and determining the CSI of the one or more wireless channels based on the received NDPs.

20. The method of claim 19, wherein the sounding trigger frame includes a Dialogue Token field carrying the respective unique second ID of the corresponding measurement instance and the respective unique first ID identifying the respective set of sensing parameters.

21. The method of claim 20, wherein the sounding trigger frame includes a control field indicating that the sounding trigger frame is a Trigger Frame (TF) Sensing trigger frame.

22. The method of claim 20, wherein the poll frame, the sounding trigger frame, and an NDP Announcement identify the one or more of the plurality of responder devices based on respective association IDs or unassociated IDs of the one or more of the plurality of responder devices.

23. The method of claim 22, wherein one or more of the poll frame, the sounding trigger frame, or the NDP Announcement includes a transmitter address (TA) field configured to verify respective AIDs or UIDs of the one or more of the plurality of responder devices.

24. The method of claim 20, wherein one or more of the poll frame, the sounding trigger frame, or an NDP Announcement includes a receiver address (RA) field set to a broadcast address.

25. The method of claim 1, wherein the initiator device is an access point (AP), and the method further includes configuring a tunneled direct link setup (TDLS) between two or more of the plurality of responder devices.

26. The method of claim 25, wherein a first group of the plurality of responder devices includes wireless stations (STAs) associated with the AP and identified by AIDs, and a second group of the plurality of responder devices includes unassociated STAs identified by UIDs associated with a Pre-Association Security Negotiation (PASN).

27. The method of claim 1, wherein the initiator device is a wireless station (STA), and the method further comprises:

establishing a tunneled direct link setup (TDLS) between the initiator device and two or more of the plurality of responder devices.

28. The method of claim 1, wherein the initiator device is a wireless station (STA), and the method further comprises:

selecting an access point (AP) as a proxy for the initiator device; and delegating, to the selected AP, one or more of the negotiation of the respective sets of one or more sensing parameters, transmission of poll frames, transmission of trigger frames, transmission of Null Data Packet Announcements (NDPAs), transmission of NDPs, or renewals of long training field (LTF) keys associated with a measurement setup.

29. A wireless communication device comprising:

one or more memories storing processor-executable code; and one or more processors coupled with the one or more memories and individually or collectively configured to, when executing the code, cause the wireless communication device to:

negotiate, with a plurality of responder devices, respective sets of one or more sensing parameters based at least in part on capabilities of the wireless communication device and respective capabilities of the plurality of responder devices, the respective sets of one or more sensing parameters being identified by a respective unique first identifier (ID);

perform one or more measurement instances on one or more wireless channels with the plurality of responder devices based on the respective sets of one or more sensing parameters, each measurement instance of the one or more measurement instances being identified by a respective unique second ID and the respective unique first ID; and obtain, from each of the plurality of responder devices, one or more measurement reports indicating channel state information (CSI) based on the one or more measurement instances, each measurement report including the respective unique second ID of a respective measurement instance and the respective unique first ID.

30. A non-transitory computer-readable medium storing code for wireless communications, the code including instructions executable by one or more processors to cause an initiator device to:

negotiate, with a plurality of responder devices, respective sets of one or more sensing parameters based at least in part on capabilities of the initiator device and respective capabilities of the plurality of responder devices, the respective sets of one or more sensing parameters being identified by a respective unique first identifier (ID);

perform one or more measurement instances on one or more wireless channels with the plurality of responder devices based on the respective sets of one or more sensing parameters, each measurement instance of the one or more measurement instances being identified by a respective unique second ID and the respective unique first ID; and obtain, from each of the plurality of responder devices, one or more measurement reports indicating channel state information (CSI) based on the one or more measurement instances, each measurement report including the respective unique second ID of a respective measurement instance and the respective unique first ID.

* * * * *